United States Patent
Shimizu et al.

(10) Patent No.: US 12,081,352 B2
(45) Date of Patent: Sep. 3, 2024

(54) MOBILE INFORMATION TERMINAL

(71) Applicant: MAXELL, LTD., Kyoto (JP)

(72) Inventors: Hiroshi Shimizu, Kyoto (JP); Hiroaki Ono, Kyoto (JP); Yasunobu Hashimoto, Kyoto (JP); Kazuhiko Yoshizawa, Kyoto (JP); Naohisa Takamizawa, Kyoto (JP); Nobuo Masuoka, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/174,966

(22) Filed: Feb. 27, 2023

(65) Prior Publication Data

US 2023/0224179 A1    Jul. 13, 2023

Related U.S. Application Data

(63) Continuation of application No. 15/734,246, filed as application No. PCT/JP2018/021811 on Jun. 7, 2018, now Pat. No. 11,627,007.

(51) Int. Cl.
*G06T 7/70* (2017.01)
*G06T 3/047* (2024.01)
(Continued)

(52) U.S. Cl.
CPC .......... *H04L 12/1822* (2013.01); *G06T 3/047* (2024.01); *G06T 5/80* (2024.01);
(Continued)

(58) Field of Classification Search
CPC . H04L 12/1822; H04L 12/1827; H04L 51/04; H04L 51/10; G06T 3/0018;
(Continued)

(56) References Cited

U.S. PATENT DOCUMENTS

| | | | |
|---|---|---|---|
| 2002/0032048 A1 | 3/2002 | Kitao et al. | |
| 2006/0050141 A1 | 3/2006 | Yoshimura | |
| 2006/0148517 A1* | 7/2006 | Yu | H04M 1/0235 |
| | | | 725/62 |
| 2010/0002070 A1 | 1/2010 | Ahiska | |

(Continued)

FOREIGN PATENT DOCUMENTS

| | | |
|---|---|---|
| JP | 2004-118314 A | 4/2004 |
| JP | 2004-282535 A | 10/2004 |

(Continued)

OTHER PUBLICATIONS

International Search Report of PCT/JP2018/021811 dated Sep. 11, 2018.

(Continued)

*Primary Examiner* — Stephen P Coleman
(74) *Attorney, Agent, or Firm* — Mattingly & Malur, PC

(57) ABSTRACT

When a first user makes a video call with a second user of the other side by using the video call function, a first state is set as a state in which the enclosure is flatly placed on a first surface of an object, and in which a face of the first user is included within a range of an angle of view AV1 of the front camera C1. In the first state, the mobile information terminal 1 detects a first region including the face of the first user from a wide angle image that is captured by the front camera C1, trims a first image corresponding to the first region, creates a transmission image to be transmitted to a terminal of the other side on the basis of the first image, and transmits the transmission image to the terminal of the other side.

20 Claims, 21 Drawing Sheets

(51) Int. Cl.
- *G06T 5/80* (2024.01)
- *G06T 7/73* (2017.01)
- *H04L 12/18* (2006.01)
- *H04N 7/14* (2006.01)
- *H04N 23/611* (2023.01)
- *H04N 23/69* (2023.01)
- *H04N 23/695* (2023.01)

(52) U.S. Cl.
CPC ............... *G06T 7/70* (2017.01); *G06T 7/73* (2017.01); *H04N 7/141* (2013.01); *H04N 23/611* (2023.01); *H04N 23/69* (2023.01); *H04N 23/695* (2023.01); *G06T 2207/10016* (2013.01); *G06T 2207/30201* (2013.01)

(58) Field of Classification Search
CPC .. G06T 5/006; G06T 7/70; G06T 7/73; G06T 2207/10016; G06T 2207/30201; H04N 5/23219; H04N 5/23296; H04N 5/23299; H04N 7/141; H04N 7/147; H04N 2007/145
USPC ................................................. 348/207.99
See application file for complete search history.

(56) References Cited

U.S. PATENT DOCUMENTS

| | | |
|---|---|---|
| 2011/0032492 A1 | 2/2011 | Nara |
| 2011/0063446 A1 | 3/2011 | McMordie et al. |
| 2014/0139425 A1 | 5/2014 | Sakai |
| 2016/0019412 A1 | 1/2016 | Kang et al. |
| 2017/0127017 A1 | 5/2017 | Takahashi et al. |
| 2017/0187987 A1 | 6/2017 | Mukai et al. |
| 2018/0052923 A1 | 2/2018 | Tudor et al. |

FOREIGN PATENT DOCUMENTS

| | | |
|---|---|---|
| JP | 2005-175777 A | 6/2005 |
| JP | 2006-067436 A | 3/2006 |
| JP | 2007-017596 A | 1/2007 |
| JP | 2008-219744 A | 9/2008 |
| JP | 2013-083755 A | 5/2013 |
| JP | 2014-103479 A | 6/2014 |
| WO | 2015/182440 A1 | 12/2015 |

OTHER PUBLICATIONS

Japanese Office Action received in corresponding Japanese Application No. 2023-085363 dated Jun. 11, 2024.

* cited by examiner

FIG. 7
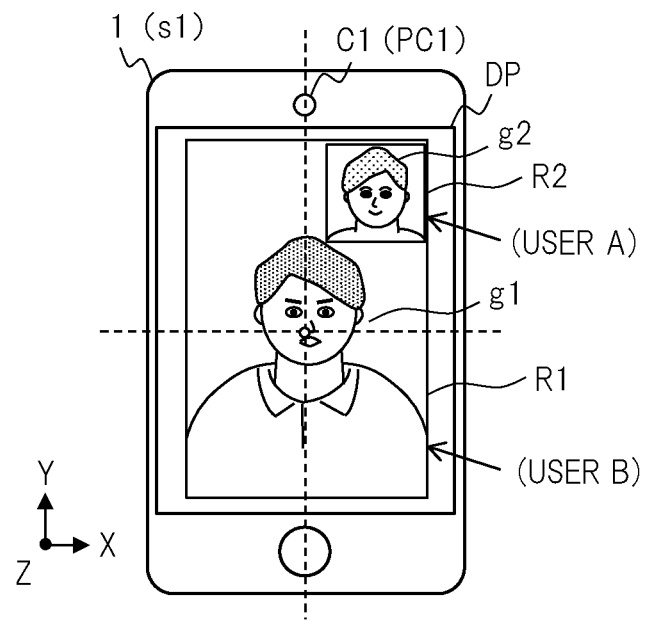
(A)
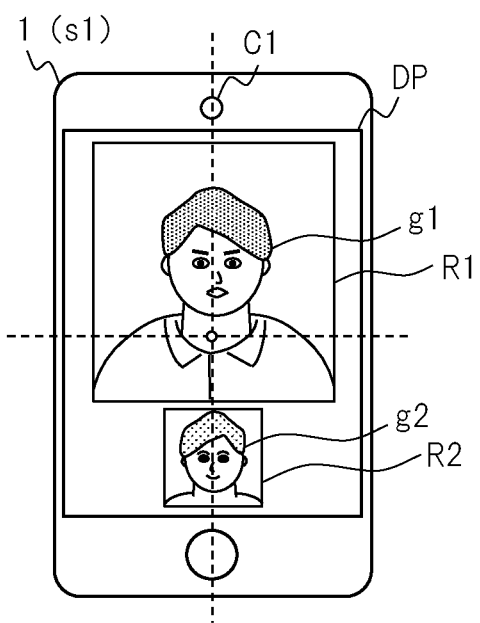
(B)

REGULAR IMAGE

WIDE ANGLE IMAGE,
FACE REGION DETECTION

TRIMMED IMAGE
(CASE OF RECTANGULAR SHAPE)

FIG. 12
(A)
TRIMMED IMAGE
(CASE OF SHAPE FITTED INTO
WIDE-ANGLE IMAGE
COORDINATE SYSTEM)
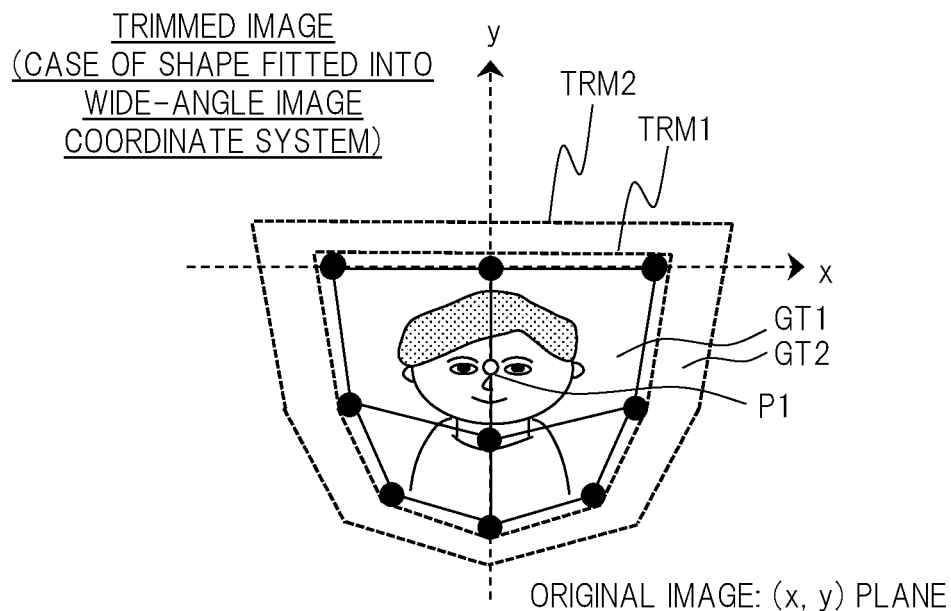
ORIGINAL IMAGE: (x, y) PLANE
DISTORTION CORRECTION
(NORMAL-IMAGE CONVERSION)
(B)
PLANARIZED IMAGE
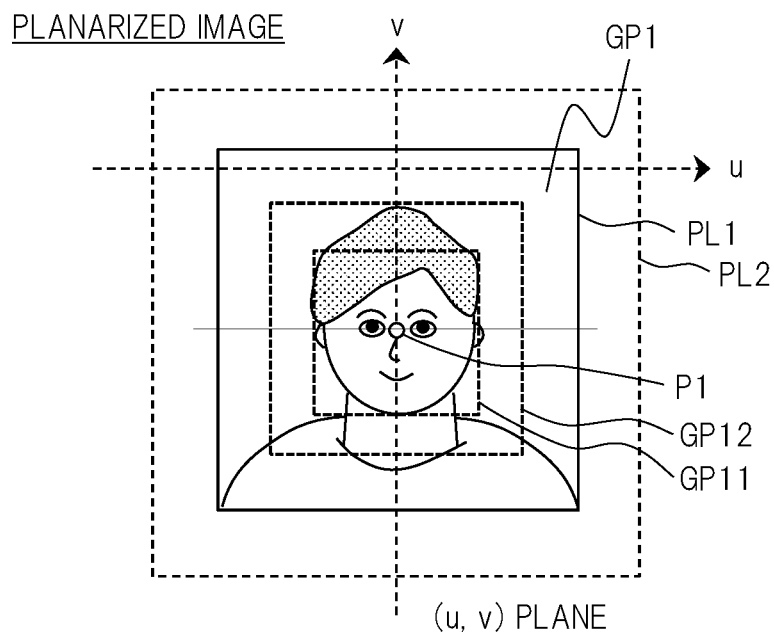
(u, v) PLANE

NORMAL-IMAGE CONVERSION

FIG. 15
(A)
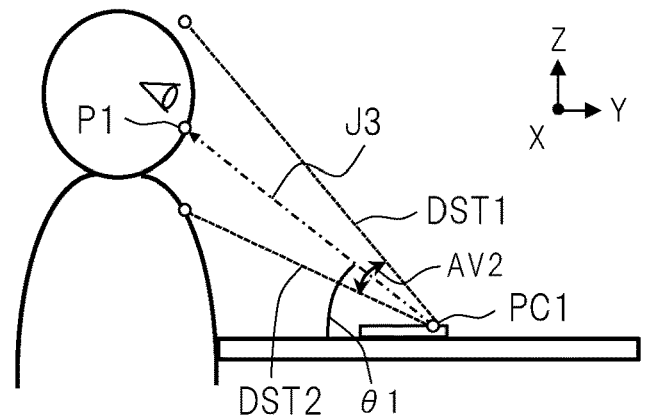
(B)
TRAPEZOIDAL IMAGE    v ▲ FAR, SHORT
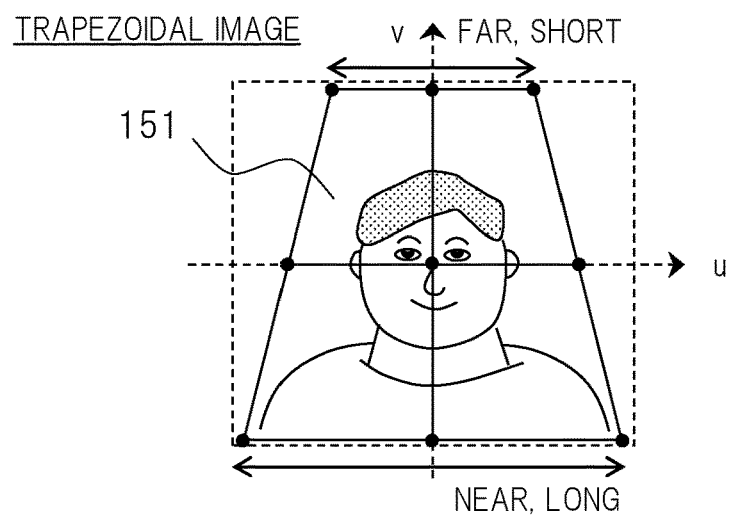
NEAR, LONG
⬇ TRAPEZOID CORRECTION
(C)
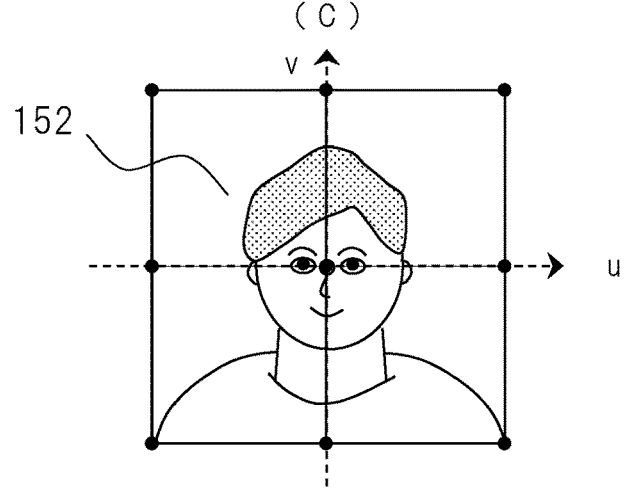

HANDSFREE STATE

COMPARISON EXAMPLE
NON-HANDSFREE STATE
(REGULAR VIDEO CALL MODE)

FIG. 23
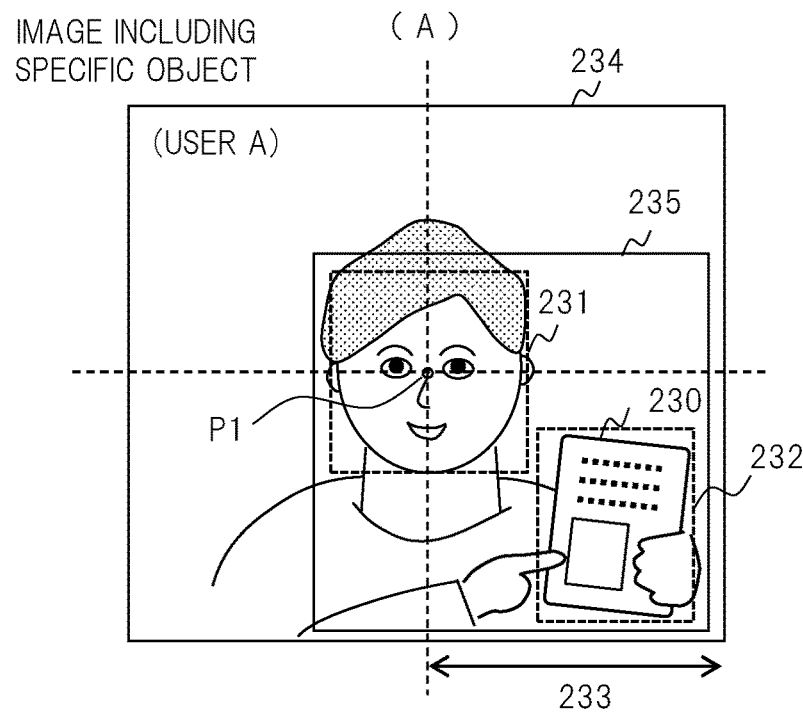
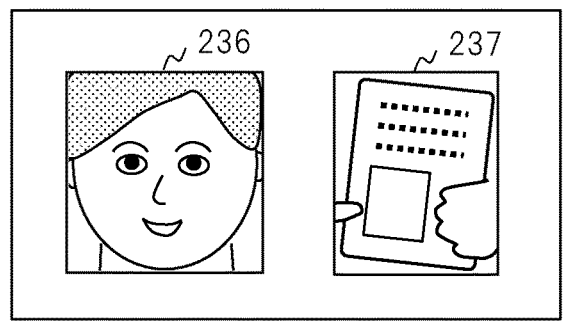
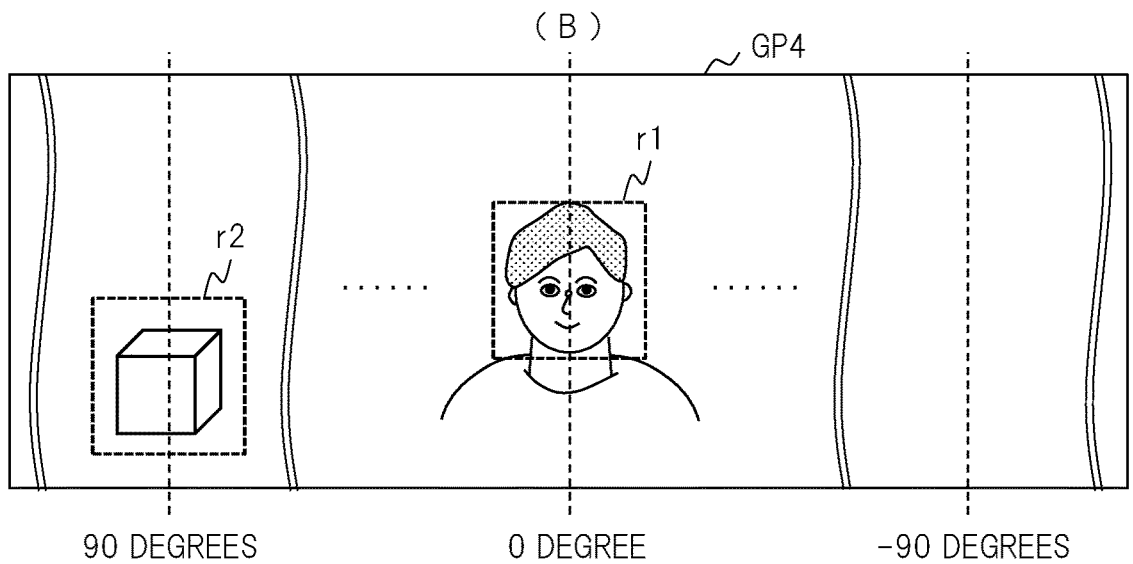

FIG. 24
(A)
IMAGE INCLUDING PLURALITY OF USER'S FACES
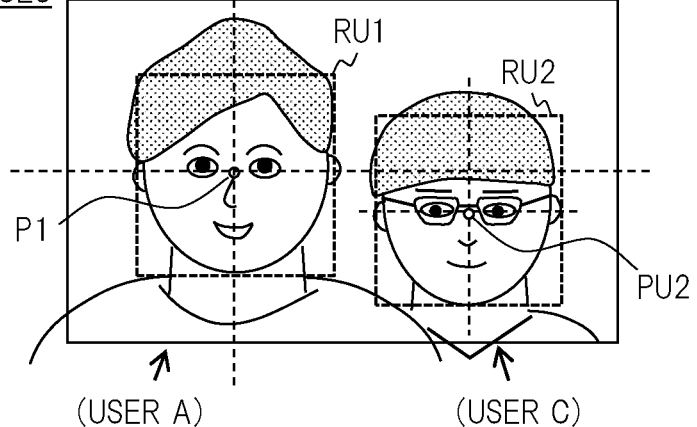
(USER A)   (USER C)
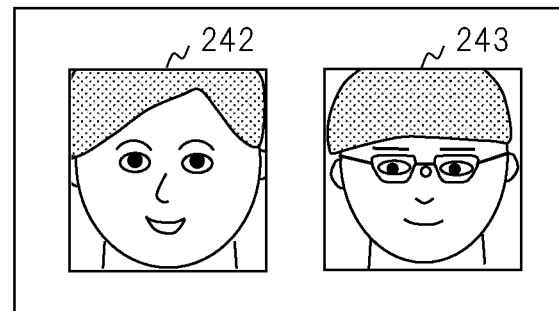
(B)
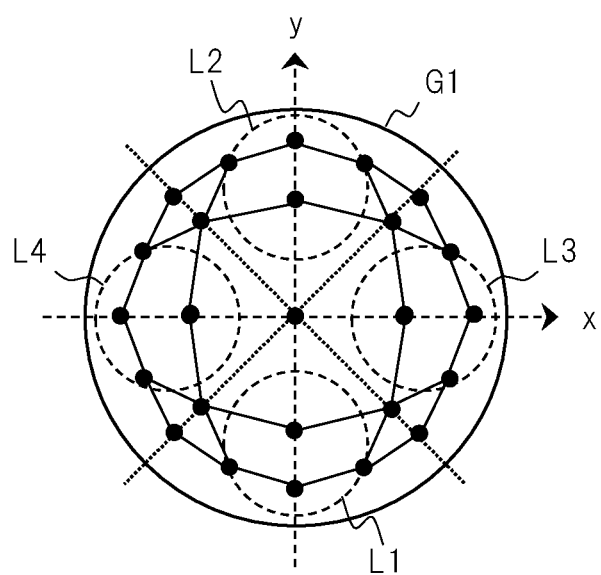

FIG. 25
(A)
THE OTHER-SIDE IMAGE (REGULAR)
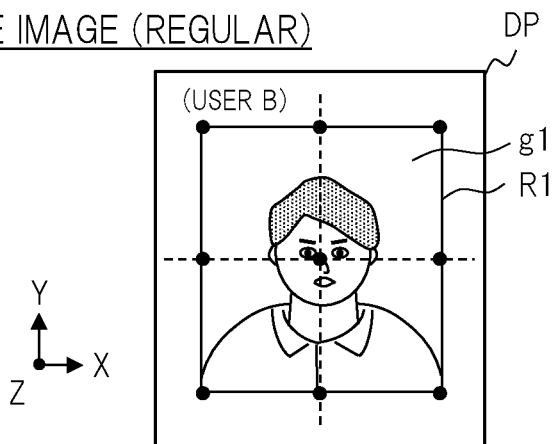
(B)
VIEW FROM USER A
(TRAPEZOIDAL SHAPE)
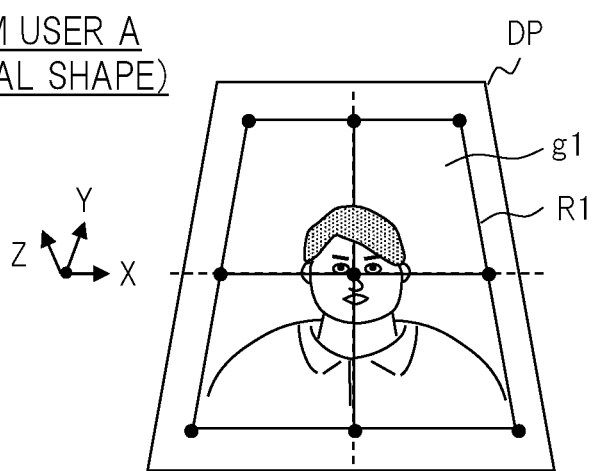
(C)
INVERSELY-TRAPEZOID-CORRECTED
IMAGE
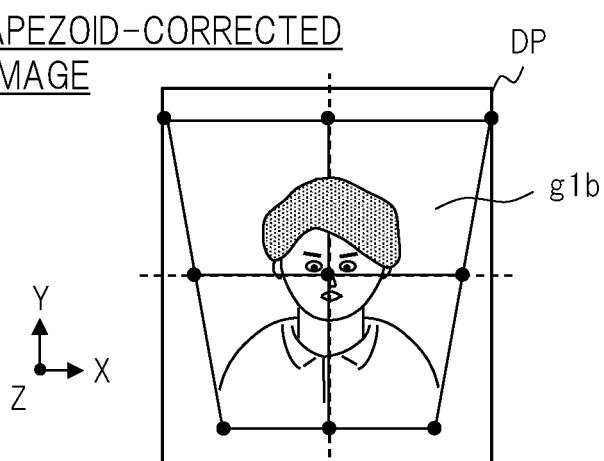

FIG. 26
COMPARISON EXAMPLE
(A)
HANDSFREE STATE
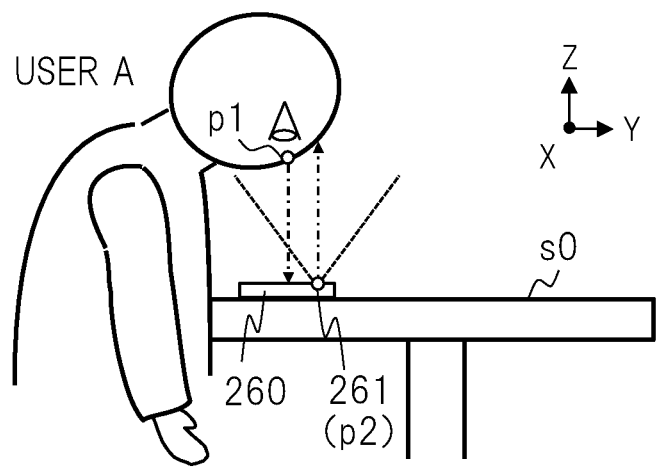
(B)
HANDSFREE STATE
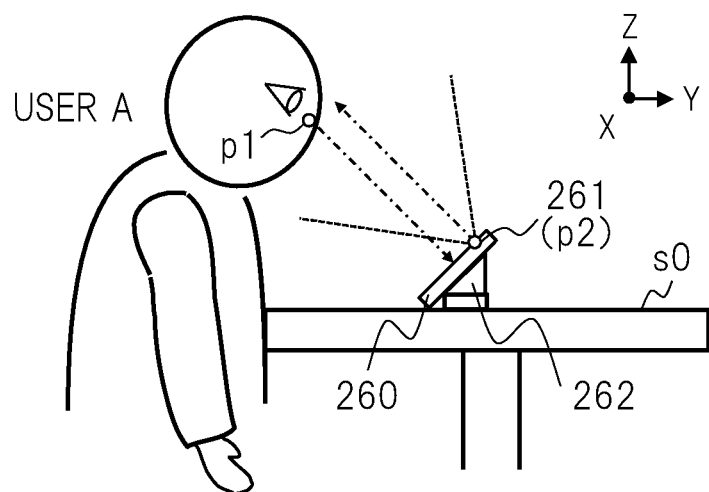

MOBILE INFORMATION TERMINAL

TECHNICAL FIELD

The present invention relates to a technique of a mobile information terminal such as a smartphone, and more particularly relates to a video call (Video phone) function.

BACKGROUND ART

In recent years, in mobile information terminals such as smartphones and tablet terminals, downsizing by high dense mounting on one enclosure having a substantially flat plate shape or others has been advanced, and installation of various functions and sophisticated functions has been advanced. As these functions, a video reception function, a digital camera function, video call function and others are cited. Particularly, the video call function of the mobile information terminal has been gradually readily available because of applications and services such as Skype®.

As the digital camera function, such a mobile information terminal has a camera (also called front camera) that is arranged on a front surface having a display screen among main surfaces of the enclosure and a camera (also called rear camera) that is arranged on a rear surface opposite to the front surface.

When the user makes the video call (also referred to as chat often) by using the mobile information terminal, the user uses the front camera on the front surface on which the user can capture his/her image. The mobile information terminal displays an image of the other side of the video call that is received from the terminal of the other side, on the display screen, and transmits the user's image that is captured by the front camera, to the terminal of the other side. Therefore, regularly, the user needs to keep, for example, the front surface of the mobile information terminal that is held by either one hand at a position at which the front surface faces the user's face and line of sight in front, such as a position at which the enclosure nearly vertically stands. In this case, both hands of the user are not free.

When the user makes the video call by using the mobile information terminal, a both-hand free state (also referred to as handsfree often) is desirable often. In this case, the handsfree video call is achieved in a positional relation in which, for example, the user orients his/her face in vertical to the display screen and the front camera while placing the enclosure of the mobile information terminal on a horizontal surface of a desk or others.

As related-art examples of the mobile information terminals and the video call function, Japanese Patent Application Laid-Open Publication No. 2005-175777 (Patent Document 1) and Japanese Patent Application Laid-Open Publication No. 2007-17596 (Patent Document 2) are cited. The Patent Document 1 describes the mobile telephone that can improve the user's visual recognition when the mobile telephone is placed on the desk, and that can handle the handsfree video call by changing the main body shape. The Patent Document 2 describes the mobile terminal device that acquires information of the user's face on the basis of the image captured by the camera of the main body, that recognizes the relative positional relation between the direction of the face and the direction of the main body, and that determines the direction of the information to be displayed on the display screen.

RELATED ART DOCUMENTS

Patent Documents

Patent Document 1: Japanese Patent Application Laid-Open Publication No. 2005-175777
Patent Document 2: Japanese Patent Application Laid-Open Publication No. 2007-17596

SUMMARY OF THE INVENTION

Problems to be Solved by the Invention

When the user makes the video call by using the mobile information terminal, a regular state without the free of the both hands (also referred to as non handsfree often) has a lack of convenience often. For example, the user cannot make the video chat while operating a PC by his/her both hands, and is difficult to make the video chat while showing any object such as a document to the other side of the video chat.

When the user makes the video call by using the mobile information terminal, in order to achieve the handsfree state with the free of the both hands, the user needs to take uncomfortable posture so as to make the positional relation causing the user's face to face the enclosure that is flatly placed on, for example, the horizontal surface of the desk or others, and therefore, this video call is inconvenient. Alternatively, although the convenience is achieved if the enclosure is obliquely arranged with respect to the horizontal surface of the desk or others by using a fixing tool, there is a lack of readiness since the fixing tool is necessary. Alternatively, although the same state is achieved if a mobile information terminal of a fold-type, a separate-type or others, orientation of which is deformable, is used, this manner is not applicable to a case of a mobile information terminal having one enclosure having a substantially flat plate shape.

A purpose of the present invention relates to a technique of a mobile information terminal having a video call function, and is to provide a technique capable of making a favorable and convenient video call in a handsfree state based on a structure with an enclosure having a substantially flat plate shape but without a specific deformable structure.

Means for Solving the Problems

A typical embodiment of the present invention relates to a mobile information terminal, and includes a feature having the following configurations. In a mobile information terminal having a video call function as the mobile information terminal of one embodiment, a first camera including a wide angle lens is arranged at a predetermined position of a front surface of a flat plate enclosure, the front surface having a display screen. When a first user makes video call with a second user of the other side by using the video call function, a first state is set as a state in which the enclosure is flatly placed on a first surface of an object while a face of the first user is included within a range of a first angle of view of the first camera. In the first state, a first region including the face of the first user is detected from a wide angle image that is captured by the first camera, a first image corresponding to the first region is trimmed, a transmission image to be transmitted to a terminal of the other side that is a mobile information terminal of the second user is created on the basis of the first image, and the transmission image is transmitted to the terminal of the other side.

Effects of the Invention

According to the typical embodiment of the present invention, more favorable and convenient video call in a handsfree state is achieved.

BRIEF DESCRIPTIONS OF THE DRAWINGS

FIG. 7 is a diagram showing an example of a display screen in the mobile information terminal of the first embodiment;

FIG. 12 is a diagram showing an example of a trimmed image in the mobile information terminal of the first embodiment;

FIG. 15 is a diagram showing an example of trapezoid correction in the mobile information terminal of the first embodiment;

FIG. 23 is a diagram showing an example of an image including a specific object in the mobile information terminal of the modification example of an embodiment;

FIG. 24 is a diagram showing an example of an image including faces of a plurality of users in the mobile information terminal of the modification example of an embodiment;

FIG. 25 is a diagram showing an example of an image subjected to an other-side-image correcting function in the mobile information terminal of the modification example of an embodiment; and FIG. 26 is a diagram showing an example of a state in which video call in a handsfree state is achieved in the mobile information terminal of the modification example of an embodiment.

BEST MODE FOR CARRYING OUT THE INVENTION

Figure 1:
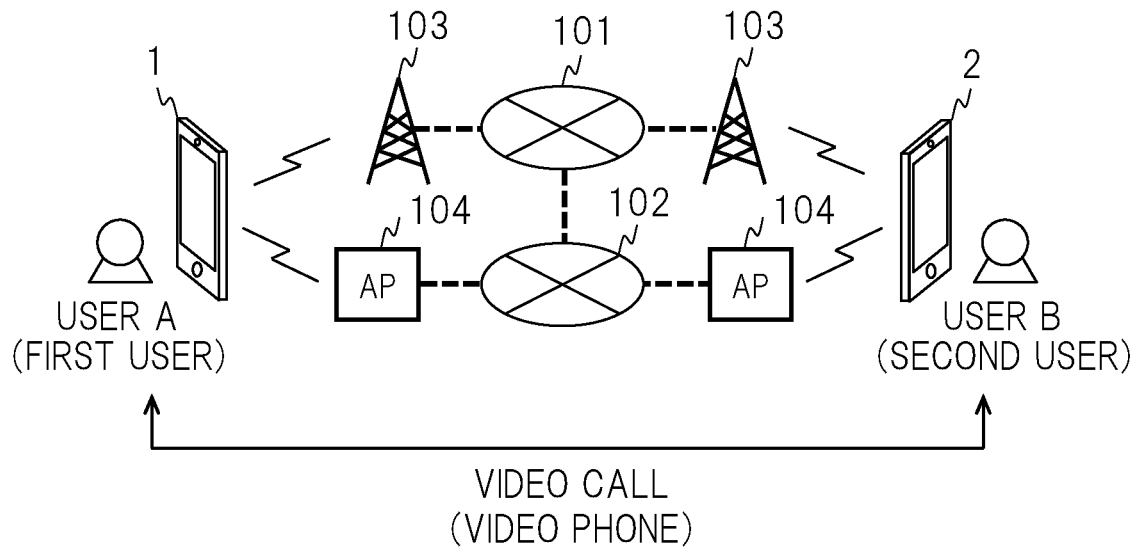
FIG. 1 is a diagram showing a configuration of a communication system and a video call system including a mobile information terminal of a first embodiment of the present invention.

Hereinafter, embodiments of the present invention will be described in detail with reference to the accompanying drawings. Note that the same components are denoted by the same reference symbols in principle throughout all the drawings for describing the embodiments, and the repetitive description thereof will be omitted. As directions for explanation, note that an X direction, a Y direction and a Z direction are used. The X direction and the Y direction are two directions that configure a horizontal plane and are perpendicular to each other, and the Z direction is a vertical direction. The X direction is made of right and left directions particularly when being viewed by the user, and the Y direction is made of front and rear directions particularly when being viewed by the user.

[Issues and Others]

Issues and others will be supplementarily explained. As a comparison example, FIG. 26 shows examples of a usage state made in an attempt to achieve a handsfree state using a mobile information terminal with a related-art video call function. FIG. 26(A) shows a first example and FIG. 26(B) shows a second example. In a state of FIG. 26(A), a user A flatly places an enclosure of a mobile information terminal 260 on a horizontal surface "s0" of a desk or others. A front surface of the enclosure has a display screen and a front camera 261. A lens of the front camera 261 is arranged at a position of a point "p2". The front camera 261 is a regular camera having a regular angle of view. A typical point of eyes or a face of the user A is represented by a point "p1". A direction of a line of sight from the point p1 is a vertical downward direction. The user A takes his/her posture so that his/her neck is bent to bring his/her face or eyes (point p1) to be positioned to face the display screen and the front camera 261 on the front surface of the enclosure. Under such a state, the user A can make the video call while making his/her both hands free. However, since the posture is unnatural, a load is applied to his/her body, and the state is inconvenient.

In FIG. 26(B), the user A places the enclosure of the mobile information terminal 260 on the horizontal surface s0 of the desk or others, and arranges and fixes the enclosure by using a fixing tool 262 so that the front surface inclines. A direction of the face of the user A or the line of sight from the eyes (point p1) of the user A is an oblique downward direction. A direction of an optical axis from the front camera 261 (point p2) is an oblique upward direction (such as an elevation angle of about 45 degrees). Under such a state, the user A can make the video call while making his/her both hands free. However, such a state cannot be achieved if the fixing tool 262 such as a hold stand is not used, and therefore, there are a lack of general-purpose versatility and readiness since the user A needs to have the fixing tool 262 or others.

Alternatively, the same state can be achieved if a mobile information terminal that is structured to have deformable orientation is used instead of the fixing tool 262. For example, in the technique of the Patent Document 1, the camera and the display screen can be arranged so as to face the user's face by changing a shape of a fold-type mobile information terminal. However, in a case of a mobile information terminal 261 having one enclosure with the substantially flat shape, the mobile information terminal does not have a moving structure for the deformation, and therefore, such a technique is not applicable.

First Embodiment

With reference to FIGS. 1 to 19, a mobile information terminal of a first embodiment of the present invention will be explained. In the mobile information terminal of the first embodiment, when the user makes the video call using the mobile information terminal (simply referred to as terminal often) as seen in FIG. 2 described later, the user does not need to hold the enclosure in the user's hand, and the handsfree state is achieved. When the user attempts to make the video call in the handsfree state, the consideration for and time and effort for arranging (the front surface of) the enclosure of the mobile information terminal to face the user's face are unnecessary. In order to achieve the favorable video call in the handsfree state, the mobile information terminal of the first embodiment has a structure such as a camera as described below, and defines the positional relation between the user's face and the terminal and the terminal arrangement state.

The mobile information terminal of the first embodiment has a wide angle camera having a wide angle of view as the front camera (first camera) formed on the front surface of the enclosure. This front camera has an optical axis that is vertical to the front surface of the enclosure, and a cross-sectional surface made by the front surface and the optical axis has, for example, a predetermined wide angle of view of about 180 degrees (at least a range of an angle from 30 degrees to 150 degrees) (360 degrees as a horizontal angle of view).

When the user uses the video call in the handsfree state, the user flatly places the enclosure having the substantially flat shape on the substantially horizontal surface of the desk or others so that the front camera of the front surface is oriented upward. Then, the positional relation is set so that the user's face is arranged in the elevation-angle direction that is an oblique upward direction when being viewed from the position of the front camera of the terminal. As the positional relation, the display screen of the enclosure and the front camera are at a position that the user's eyes obliquely look down. In this state (first state), a direction of the image capturing of the face by the front camera and a direction of the display screen when being viewed from the user's eyes are substantially equal or sufficiently close to each other. These directions are, for example, about 45 degrees (for example, an angle in an angle range from 30 degrees to 60 degrees) as the elevation angle with respect to the horizontal surface.

In the case of such a positional relation and an arrangement state, the face of the user is projected in a partial region (such as a region within an angle range, for example, from 0 degree to 90 degrees) inside an image (wide angle image) of the front camera. The mobile information terminal can capture a region including the face of the user by using this wide angle image. The mobile information terminal detects the region including the face of the user from this wide angle image, and trims (cuts out) the region.

However, inside the wide angle image that is captured through the wide angle lens, distortion that is unique to the wide angle lens occurs in the entire wide angle image including the face of the user. When the wide angle image is transmitted to the mobile information terminal of the other side, there is a concern that a user of the other side is difficult to recognize the face of the user or others from the wide angle image. Therefore, the mobile information terminal of the first embodiment performs a distortion correcting processing to the region including the face in the wide angle image, so that a planarized image, distortion of which is removed or reduced, is acquired. In the manner, a favorable transmission image that is visually easier to be recognized can be acquired.

A mobile information terminal 1 creates the transmission image to be transmitted to the terminal of the other side of the video call by using the distortion-corrected image including the face of the user A, and then, transmits the transmission image to the terminal of the other side. As described above, in the mobile information terminal of the first embodiment, the user can make the video call in the handsfree state, and the mobile information terminal is convenient.

[(1) Communication System and Video Call System]

Figure 2:
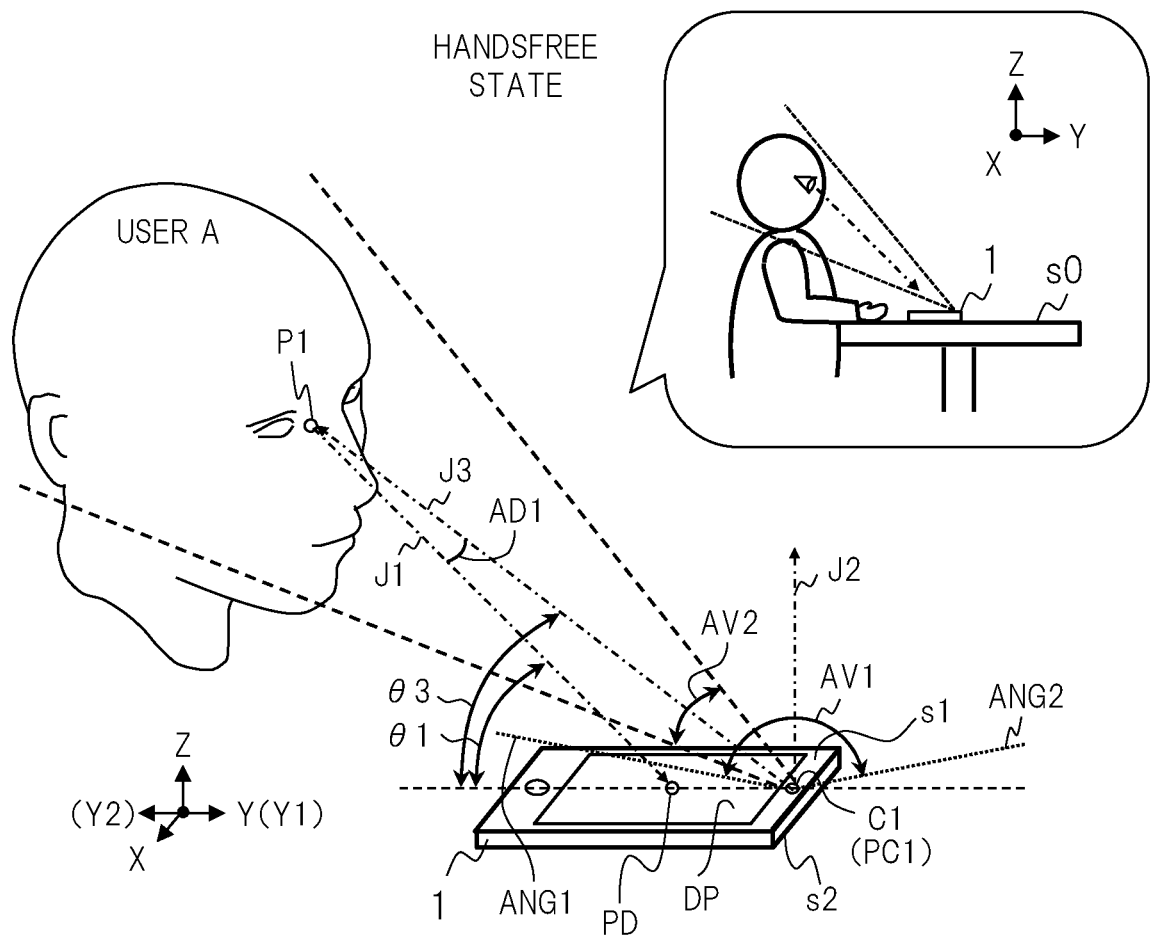
FIG. 2 is a diagram showing positional relation between a user and a terminal and a terminal arrangement state in the video call in the handsfree state using the mobile information terminal of the first embodiment.

FIG. 1 shows the entire configuration of a communication system and a video call system including the mobile information terminal 1 of the first embodiment. In the communication system and the video call system of FIG. 1, the mobile information terminal 1 of the first user (user A) and a mobile information terminal 2 of a second user (user B) are connected to each other through a mobile communication network 101 and the Internet 102. The video call communication is made between the mobile information terminal 1 of the first user and the mobile information terminal 2 of the second user. A base station 103 is a wireless base station configuring the mobile communication network 101. The mobile information terminals 1 and 2 are connected to the mobile communication network 101 through the base station 103. An access point 104 is an access point device for use in wires communication such as a wireless LAN. The mobile information terminals 1 and 2 are connected to the Internet 102 including the wireless LAN or others through the access point 104.

The mobile information terminals 1 and 2 are devices such as smartphones, and each of them has the video call function. The mobile information terminal 1 of the first user is the mobile information terminal of the first embodiment, and has a function that is unique to the video call. The user A is the first user who is one speaker making the video call, and the user B is the second user who is the other speaker making the video call and is the other side of the user A. The mobile information terminal 1 of the first user will be mainly explained below. The user B uses the mobile information terminal 2 with, for example, a related-art video call function. The mobile information terminal 2 of the second user may also have the unique video call function as similar to the mobile information terminal 1 of the first user. Note that a server or others that offers a service related to the video call function may be inserted in the mobile communication network 101 or the Internet 102 in the video call communication.

[(2) Outline of Usage of Video Call]

FIG. 2 is a schematic diagram showing an outline, a status and a method of usage of the mobile information terminal 1 of the user A in the video call between the user A and the user B in FIG. 1. FIG. 2 shows the positional relation between the face of the user A and the mobile information terminal 1 and the terminal arrangement state made when the user A makes the video call in the handsfree state. The usage of the video call will be outlined below.

(1)

As shown in FIG. 2, when making the video call in the handsfree state, the user A flatly places the flat-plate enclosure of the mobile information terminal 1 on a horizontal surface s0 (x-y plane, first plane) of any object such as a desk so that a front camera "C1" on a front surface "s1" is oriented vertically upward. A rear surface "s2" of the enclosure is hidden because of being in contact with the horizontal surface s0. In the mobile information terminal 1, the front surface s1 of the vertically-long enclosure mainly has a quadrangular display screen "DP", and an outer edge frame region of this display screen DP has the camera, an operational button, a microphone, a speaker and others. In the mobile information terminal 1, (particularly a wide angle lens portion of) the front camera C1 is arranged at a position "PC1" of an upper side of the frame region. In the placement, the user A particularly places the enclosure so that the front camera C1 (position PC1) on the front surface s1 is positioned in a direction "Y1" that is a deep side when being viewed from the user A in the Y direction.

The user A arranges his/her face or eyes at a position that is obliquely upward from the mobile information terminal 1. In other words, the display screen DP (point "PD") of the mobile information terminal 1 is arranged at a position that is obliquely downward from the eyes (point "P1") of the user A. A typical point corresponding to the head, the face, the eyes or others of the user A is the point P1. On the display screen DP, the image of the other side (user B) or others is displayed (FIG. 7). The user A looks at a face image of the other side or others inside the display screen DP. A direction "J1" indicates a line-of-sight direction in which the display screen DP (point PD) of the terminal is looked at by the eyes (point P1) of the user A. An angle "θ1" indicates an elevation angle with respect to from the direction J1 (the horizontal surface s0 has the angle of 0 degree as reference). The angle θ1 is an angle within a range from 30 degrees to 60 degrees, and is, for example, about 45 degrees.

Under this state, the image of the face or the eyes of the user A can be of course captured in the elevation-angle direction that is the oblique upward direction when being viewed from the front camera C1 of the terminal. The optical axis of the front camera C1 is oriented to be vertical to (vertically upward from) the front surface s1, and is indicated as a direction "J2". An angle of view "AV1" of the front camera C1 has a wide angle range centered at the optical axis, having 360 degrees as a horizontal angle of view and about 180 degrees as an angle of view on a Y-Z cross section, particularly an angle range from a first angle "ANG1" to a second angle "ANG2". For example, the first angle ANG1 is equal to or smaller than 30 degrees, and the second angle ANG2 is equal to or larger than 150 degrees.

Under this state, the front camera C1 can capture the image of the face of the user A at the wide angle of view AV1. In other words, under this state, the angle of view AV1 of the camera C1, particularly an angle range from the first angle ANG1 to 90 degrees includes an angle of view (face-image capture angle of view) "AV2" corresponding to a range in which the image of the face of the user A is captured. Correspondingly, the face of the user A is projected in a partial region inside the wide angle image of the front camera C1. A direction in which the image of the face (point P1) of the user A is captured by the front camera C1 (point PC1) is indicated by a direction "J3". An elevation angle corresponding to the direction J3 is indicated by an angle "θ3". The angle θ3 is an angle that is, for example, slightly smaller than 45 degrees.

The line-of-sight direction J1 of the user A and the direction J3 of the image capturing from the front camera C1 are sufficiently close to each other, and an angle difference "AD1" between the angle θ1 and the angle θ3 is sufficiently small. Therefore, the front camera C1 can capture the image of the face of the user A at the angle of view AV2 in the direction J3 in which the line of sight of the user A can be recognized. The smaller the directional difference and the angular difference are, the more natural the line of sight inside the image is. Therefore, these small differences are preferable. In the mobile information terminal 1 of the first embodiment, the wide angle image of the front camera 1 is used, and therefore, the face of the user A can be captured as shown with the angle of view AV2 even in the positional relation as shown in FIG. 2.

(2)

Under a state in FIG. 2, the user A can make the video call (chat) while looking at the image of the other side (FIG. 7) that is displayed on the display screen DP of the mobile information terminal 1. From the speaker, the mobile information terminal 1 outputs voice/sound that the mobile information terminal has received from the mobile information terminal 2 of the other side. To the mobile information terminal 2 of the other side, the mobile information terminal 1 transmits voice/sound of the user A, the voice/sound having been input by the microphone.

The mobile information terminal 1 detects the region including the face of the user A from the wide angle image captured by the front camera C1, and trims the region. The mobile information terminal 1 creates the transmission image to be transmitted to the mobile information terminal 2 of the other side by using the trimmed image. However, the wide angle image that has been captured by the front camera C1 includes the face image of the user A, and has distortion depending on the wide angle lens.

Accordingly, the mobile information terminal 1 performs the distortion correcting processing to the trimmed image so as to remove or reduce the distortion. From the distortion-corrected image, the mobile information terminal 1 creates the transmission image to be transmitted to the mobile information terminal 2 of the other side and a monitor image for use in checking the state of the face image of the user A or others corresponding to the transmission image. On the display screen DP, the mobile information terminal 1 displays the monitor image corresponding to the transmission image (FIG. 7). Inside the monitor image (and the transmission image), the line-of-sight direction of the user A is almost oriented to the right front side. The user A can look at and check the image of (the user B of) the other side and the monitor image of the user A him/herself inside the display screen DP of the mobile information terminal 1. The user A can deny the transmission of the transmission image corresponding to the monitor image if needed.

The mobile information terminal 1 transmits the voice/sound of the user A that has been input by the microphone and data including the transmission image for use in the video call, to the mobile information terminal 2 of the other side. The mobile information terminal 2 of the other side can output the image and the voice/sound related to the user A on the basis of the received date, and the user B can make the video call with the user A.

[(3) Mobile Information Terminal]

Figure 3:
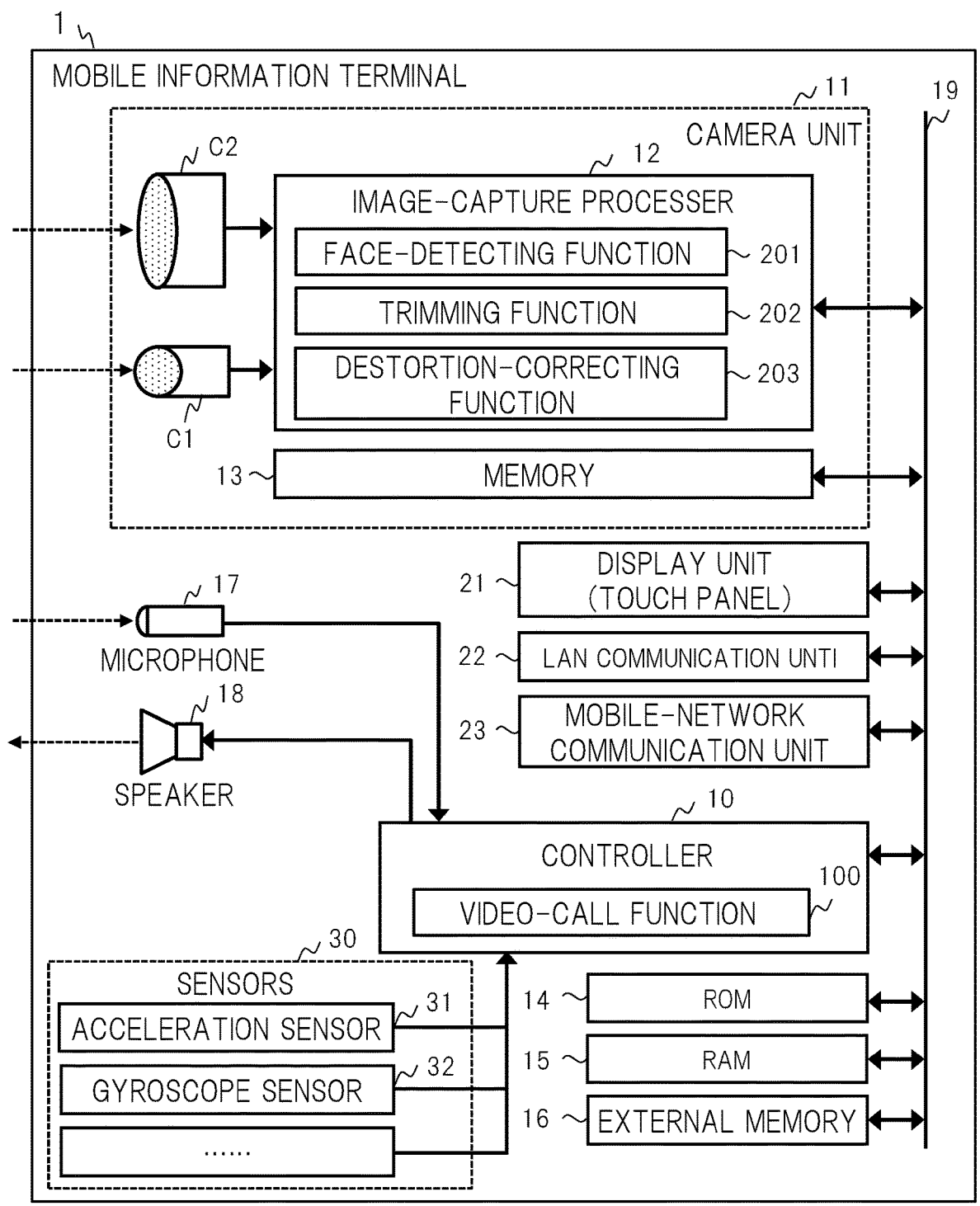
FIG. 3 is a diagram showing a configuration of the mobile information terminal of the first embodiment.

FIG. 3 shows a configuration of the mobile information terminal 1 of the first embodiment. The mobile information terminal 1 includes: a controller 10; a camera unit 11; a ROM 14; a RAM 15; an external memory 16; a microphone 17; a speaker 18; a bus 19; a display unit (touch panel) 21; a LAN communication unit 22; a mobile-network communication unit 23; sensors 30 such as an acceleration sensor 31 and a gyroscope sensor 32 and others.

The controller 10 controls the entire mobile information terminal 1 to give instructions to each unit and others. The controller 10 achieves a video call function 100 based on a video call application. The controller 10 of the mobile information terminal 1 controls the video call function 100 by using each unit and each function. The controller 10 is made of a microprocessor unit (MPU) or others, and controls the entire mobile information terminal 1 in accordance with a program of the ROM 14. Each unit such as the controller 10 receives/transmits the data from/to each unit inside the mobile information terminal 1 through the bus 19 (including a system bus).

The camera unit 11 includes the front camera C1, the regular camera (rear camera) C2, an image-capture processer 12, and a memory 13. As shown in FIG. 2 described above, the front camera C1 is arranged in the front surface s1 of the enclosure, and the regular camera C2 is arranged in the rear surface s2 of the enclosure. The front camera C1 is made of publicly-known elements such as a wide angle lens, a camera sensor (image-capture element) and a driving circuit. The camera sensor is made of, for example, a CCD, a CMOS sensor and others. The regular camera C2 is made of publicly-known elements such as a regular lens, a camera sensor and a driving circuit. The regular camera C2 has a regular angle of view, and the regular angle of view is narrower than the angle of view AV1 of the wide angle lens of the front camera C1. A direction of an optical axis of the regular camera C2 is opposite to that of the optical axis of the front camera C1. In the video call function of the first embodiment, the regular camera C2 is not used.

The image-capture processor 12 is a unit that performs an image-capture processing and an image processing by using a camera on the basis of the control of the controller 10. In the first embodiment, the image-capture processor 12 is mounted as a circuit such as an LSI that is a different unit from the controller 10. The mounting is not limited to this, and a part or entire of the image-capture processor 12 may be integrally mounted as a program processing of the controller 10 or others. A part or entire of the functions such as a face detecting function 201 may be mounted as a software program processing or as a hardware circuit or others in order to achieve high speed processing or others. The memory 13 is a memory that stores the image data or others related to the image-capture processing.

As publicly-known functions and processing units, the image-capture processor 12 has an autofocus function, an enlargement/shrink function, a codec unit, an image-quality improvement processing unit, an angle/rotation correcting unit and others. The autofocus function is a function that automatically brings a focal point of the camera to fit into an image-capture target. The enlargement/shrink function is a function that enlarges and shrinks a target of the image. The codec unit is a processing unit that compresses and decompresses the captured image and video. The image-quality improvement processing unit is a processing unit that improves an image quality of the captured image so as to perform noise reduction or others. The angle/rotation correcting unit is a processing unit that corrects the angle and the rotation of the captured image.

The microphone 17 collects voice/sound around the terminal including voice of the user A, and acquires voice/sound data. The speaker 18 outputs the voice/sound including the voice/sound of the video call that is transmitted from the mobile information terminal 2 of (the user B of) the other side of the video chat.

The display unit 21 includes the display screen DP of FIG. 2, and is particularly a touch panel such as a liquid crystal touch panel, and can be operated by user's touch input. On the display screen DP, the captured image and other various information are displayed.

The LAN communication unit 22 performs a communication processing corresponding to the communication on the Internet 102, including the wireless LAN communication with the access point 104 of FIG. 1. The mobile network communication unit 23 performs a communication processing corresponding to the communication on the mobile network 101, including the wireless communication with the base station 103 of FIG. 1.

The sensors 30 include an acceleration sensor 31 and a gyroscope sensor 32, and besides, publicly-known sensor devices such as a GPS receiver, a proximity sensor, an ambient light sensor and a temperature sensor although not illustrated. The controller 10 detects the orientation, the motion and others of the mobile information terminal 1 by using the detection information of the sensors 30. The controller 10 can also recognize whether or not the mobile information terminal 1 is being held by the user A in his/her hand and whether or not the mobile information terminal 1 is flatly placed on the horizontal surface s0 as shown in FIG. 2.

The image-capture processor 12 has a face detecting function 201, a trimming function 202 and a distortion correcting function 203 as functions to be achieved by a program, a circuit or others. The image-capture processing and the functions of the image-capture processer 12 are summarized below. In a camera mode for use in capturing the image by using the front camera C1, the wide angle image that has been captured by the front camera C1 is input to the image-capture processor 12. In the first embodiment, the moving image (a plurality of time-series image frames) can be captured by the front camera C1, and the image-capture processor 12 processes this moving image. The image is not limited to this, and a still image at a predetermined timing may be handled as the image of the front camera C1.

The image-capture processor 12 detects the region including the face of the user A from the wide angle image by using the face detecting function 201. The image-capture processor 12 trims the region including the face of the user A from the wide angle image by using the trimming function 202. The image-capture processor 12 performs the distortion correcting processing to the trimmed image by using the distortion correcting function 203. The image-capture processor 12 stores the distortion-corrected image into the memory 13. The image-capture processor 12 (or the controller 10) creates the transmission image to be transmitted to the mobile information terminal 2 of the other side and the monitor image to be checked by the user him/herself, from the corrected image.

The (video call function 100 of the) controller 10 of the mobile information terminal 1 creates the data for use in the video call, which is formed by collecting the transmission image of the user A and the voice/sound data of the user A input from the microphone 17. The controller 10 transmits the data to the mobile information terminal 2 of the other side by using the LAN communication unit 22, the mobile network communication unit 23, or others. The mobile information terminal 2 of the other side receives this data, displays the transmission image on the display screen, and outputs the voice/sound.

The (video call function 100 of the) controller 10 receives data for use in the video call (including the image and the voice/sound of the other side) from the mobile information terminal 2 of the other side through the LAN communication unit 22 or the mobile network communication unit 23. The controller 10 displays the image of the other side among the received data into the display screen DP, and displays the monitor image of the user A. The controller 10 outputs the voice/sound of the other side from the speaker 18.

[(4) Software Configuration]

Figure 4:
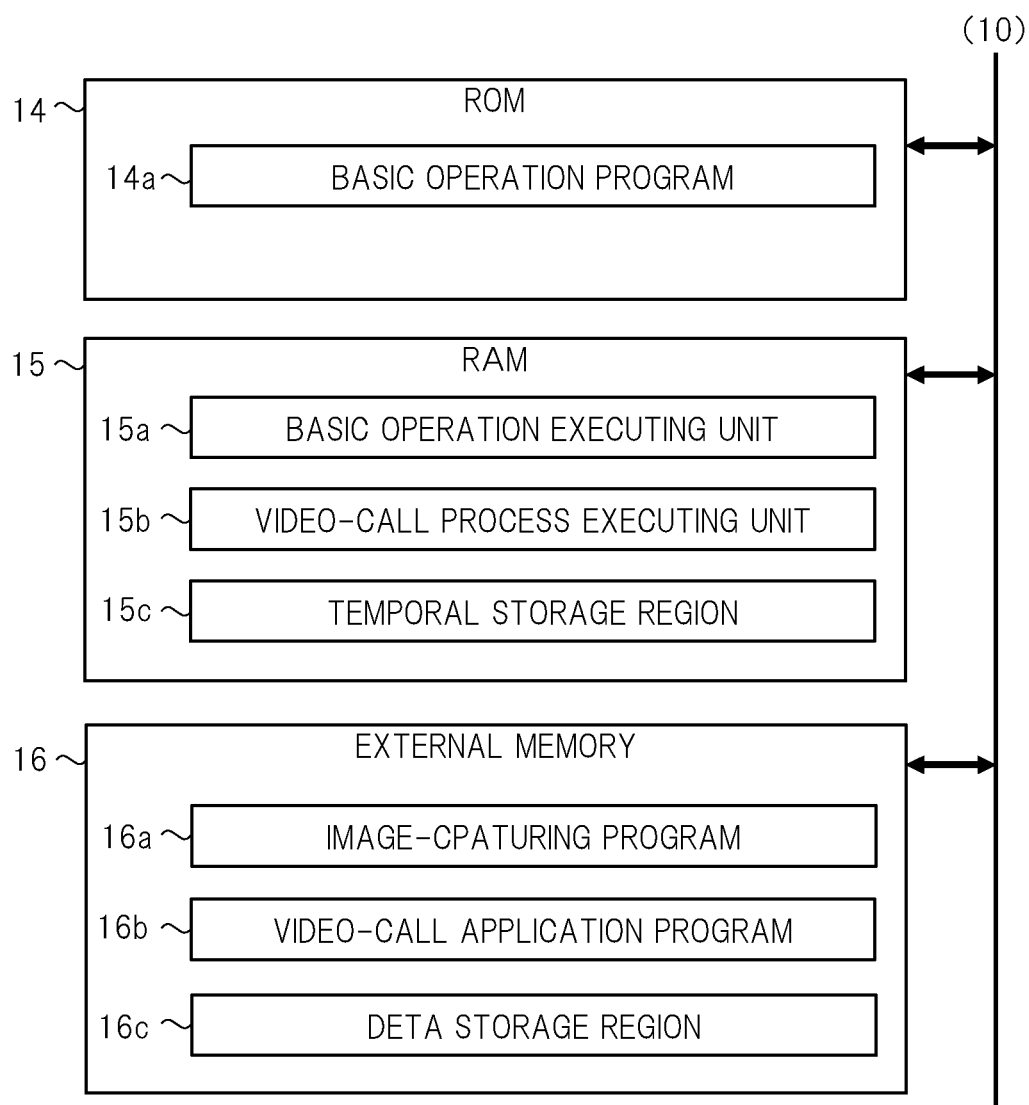
FIG. 4 is a diagram showing a software configuration in the mobile information terminal of the first embodiment.

FIG. 4 shows a software configuration of the mobile information terminal 1. In the ROM 14, a basic operational program 14*a* such as an OS or a middleware, other application programs and others are stored. As the ROM 14, a rewritable ROM such as an EEPROM, a flash ROM or others is used. A program of the ROM 14 can be appropriately updated through the communication or others, a version thereof can be upgraded, and a function or others thereof can be enhanced. The ROM 14 or others may be as one body with the controller 10.

The RAM 15 is used as a work area in execution of the basic operational program 14*a*, a video-call application program 16*b* and others. The RAM 15 also includes a temporal storage region 15*c* for use in temporarily storing the data and the information in execution of various programs if needed. The controller 10 (MPU) loads the basic operational program 14*a* of the ROM 14 into the RAM 15, and executes a processing in accordance with this program. In the manner, a basic operational execution unit 15*a* is formed in the RAM 15. Similarly, a video-call processing execution unit 15*b* is formed in the RAM 15 in accordance with the processing of the video-call application program 16*b*. In the temporal storage region 15*c*, processing data related to the video call function 100 is stored, and the information such as the position, the orientation and others of the mobile information terminal 1 is also stored.

Programs such as the image-capture program 16*a* and the video-call application program 16*b* are stored in the external memory 16, and the external memory 16 also includes a data storage region 16*c* for use in storing the image captured by the image-capture processor 12 and the data or information related to various processing. The external memory 16 is made of a non-volatile storage device that retains the data even when not being supplied with power, and, for example, a flash ROM, an SSD or others is used. In the data storage region 16*c*, for example, a setting value of the function or the operation of the mobile information terminal 1 is also stored. The various programs may be stored in the ROM 14, a different non-volatile storage device or others. The mobile information terminal 1 may acquire the program or the information from an external server apparatus or others.

By the image-capture program 16*a*, the image-capture processing can be achieved in the image-capture processor 12 of the camera unit 11. This image-capture processing includes a control processing for general camera image capturing not only for use in the video call and an image-capture control processing for use in the video call. The image-capture program 16*a* is loaded into the RAM 15 or the image-capture processor 12, so that the execution unit is formed.

To the image-capture processor 12, the controller 10 (MPU) gives instructions of the camera mode, start/end of the image capturing of the moving image using the camera, and setting for the image-capture details (such as focus and exposure) and others. The camera mode indicates which camera of a plurality of cameras is to be used for the image capturing.

The video-call processing execution unit 15*b* based on the video-call application program 16*b* performs a processing corresponding to the video call function 100. The controller 10 (MPU) performs the control processing to each function of the image-capture processor 12 and the control processing to each relative unit in order to achieve the execution of the video call function 100.

[(5) Camera Unit and Image-Capture Processor]

Figure 5:
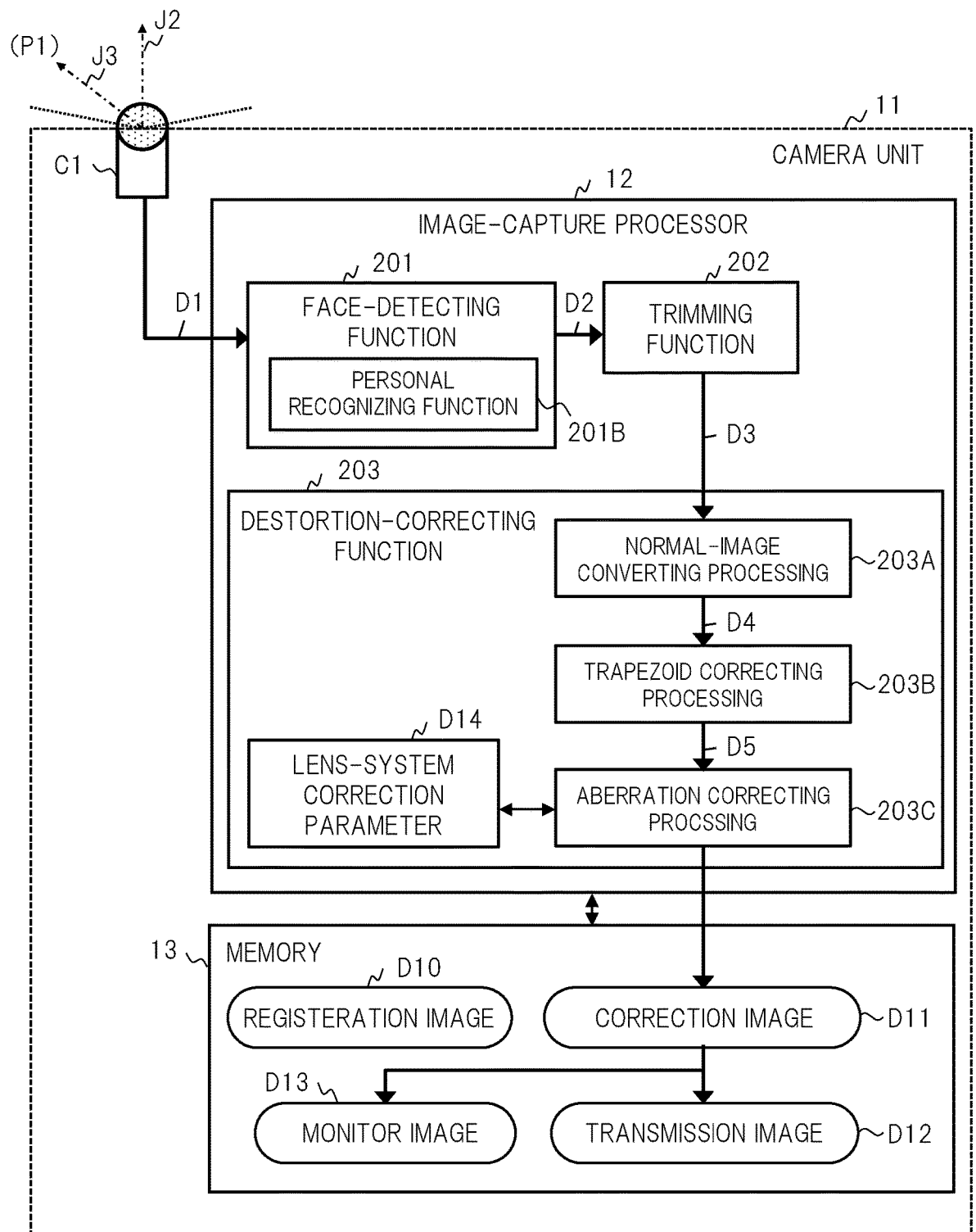
FIG. 5 is a diagram showing a configuration of a camera unit in the mobile information terminal of the first embodiment.

FIG. 5 shows detailed configurations of the camera unit 11, the image-capture processor 12 and the memory 13. The face detecting function 201 of the image-capture processor 12 includes a personal recognizing function 201B. The distortion correcting function 203 performs a normal-image converting processing 203A, a trapezoid correcting processing 203B, an aberration correcting processing 203C and others as its processing. In the memory 13, data such as a registration image D10, a corrected image D11, a transmission image D12, and a monitor image D13 is stored. The memory 13 temporarily stores the captured image data, and is also used as a work area related to a processing for each function. The memory 13 may exist inside the image-capture processor 12. The processing of the image-capture processor 12 will be outlined below.

(1)

Figure 9:
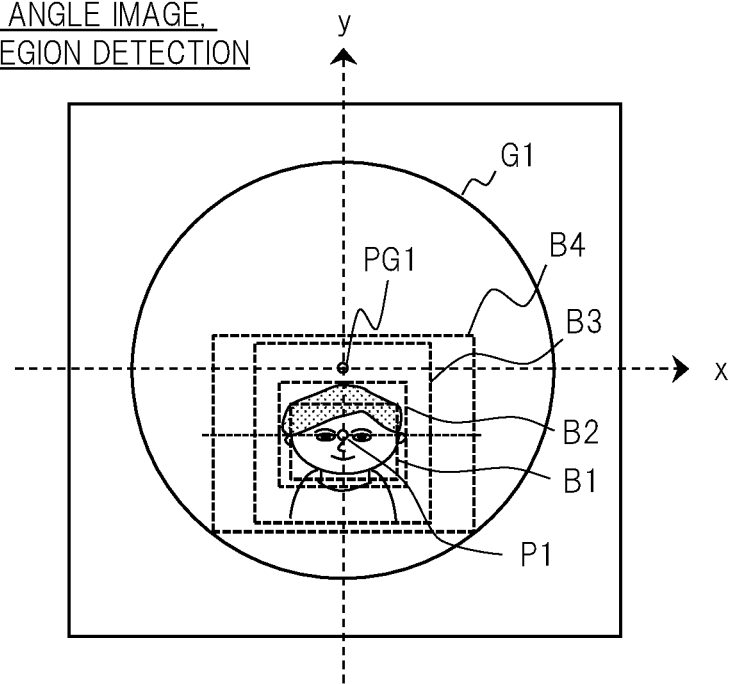
FIG. 9 is a diagram showing an example of a wide angle image and face detection using a front camera in the mobile information terminal of the first embodiment.

First, the wide angle image (data D1) that has been captured through the front camera C1 is input to the face detecting function 201 of the image-capture processor 12. The face detecting function 201 performs a processing of detecting the region including the face of the user A from the data D1 of the wide angle image on the basis of the image processing. The face detecting function 201 detects, for example, eyes, ears, a nose, a mouth and others by extracting a feature point group from the wide angle image, and detects a contour of a face or a head on the basis of a color of a pixel or luminance difference. In the manner, as shown in FIG. 9 described later, a face region "B1" or others can be detected. From the face detecting function 201, data "D2" of the wide angle image and a detection result is output.

The personal recognizing function 201B recognizes whether or not the face image represents a personal face of the specific user A. The image-capture processor 12 adopts a subsequent processing only when, for example, the personal face of the specific user A is detected.

(2)

Next, on the basis of the data D2 of the wide angle image, the trimming function 202 performs a processing of acquiring the trimmed image by trimming a region to be trimmed corresponding to a region including the detected face. From the trimming function 202, data "D3" of the trimmed image and others is output. As a method of the trimming, a region having predetermined shape and size is trimmed so that, for example, a center point (point P1) of the detected face region is set as a reference. Note that the region to be trimmed may be only a face region, a head region, or a region including the head and a peripheral region of the head. The type and size of the region to be trimmed can be changed by using a user setting function.

(3)

Next, on the basis of the data D3, the distortion correcting function 203 performs a processing of correcting the distortion of the trimmed image due to the wide angle lens so that the image has a plane surface having a normal image without the distortion. The distortion correcting function 203 performs a normal-image converting processing 203A (FIG. 14) to the trimmed image first. In the manner, the plane image (planarized image) having the normal image without the distortion is acquired, and data "D4" including this planarized image is output.

The distortion correcting function 203 performs a trapezoid correcting processing 203B (FIG. 15) to the data D4 including the planarized image next. In the manner, an image having a right-angle quadrangular image content converted from a trapezoidal image content is acquired, and data "D5" including this image is output. By the trapezoid conversion, the image content is converted to have a favorable appearance.

The distortion correcting function 203 performs a publicly-known processing of correcting various aberrations caused by characteristics of the lens system, except for the distortion due to the wide angle, to the data D5 next as an aberration correcting processing 203C. In the manner, a corrected image "D11" is acquired. For example, when the lens system is fixed, a lens-system correction parameter D14 is previously stored in, for example, the memory 13 at the time of the product delivery. The lens-system correction parameter D14 is setting information for use in correcting the aberration, an initial value or others, and may be settable. The lens-system correction parameter D14 is referred to in the aberration correcting processing 203C.

Note that the state of the image that has been subjected to the normal-image converting processing 203A is regularly a state in which the appearance of the face of the user A is enough not to be uncomfortable (is usable for at least the video call). Therefore, the trapezoid converting processing 203B and the aberration correcting processing 203C may be eliminated. It is not always necessary to perform the processings of the distortion correcting function 203 in this order, and the processings may be performed in any order. Alternatively, depending on conditions, specific processings may be controlled so as not to be performed.

(4)

The corrected image D11 formed by the distortion correcting function 203 is stored in the memory 13. In the corrected image D11, the distortion due to the wide angle image and the lens aberration are removed or reduced, and therefore, this image is the image having the quality that makes the face or others recognizable with the less uncomfortableness for the user. The image-capture processer 12 or (the video call function 100 of) the controller 10 uses the corrected image D11, and creates the transmission image D12 to be transmitted to (the user B of) the other side and the monitor image D13 for self-checking. The controller 10 uses the transmission image D12 and the voice/sound that has been input by the microphone 17, and creates the data for use in the video call.

The transmission image D12 is an image that has been, for example, appropriately cut or enlarged/shrunk so as to be fitted into an image size (display screen size or others) that is requested by the mobile information terminal 2 of the other side. The monitor image D13 is an image that has been, for example, appropriately cut or enlarged/shrunk so as to be fitted into a size of a monitor-image display region (region "R2" in FIG. 7) inside the display screen DP.

(5)

The controller 10 displays the monitor image D13 in a region inside the display screen DP. When the result of the checking for the monitor image D13 by the user A is accepted (the transmission is allowed), the controller 10 transmits the data including the transmission image D12 to the mobile information terminal 2 of the other side through the communication unit.

(6)

The image-capture processor 12 creates the transmission image D12 by using the registration image D10 when, for example, the face of the user A cannot be detected by the face detecting function 201 or when the image-capture processor 12 receives an instruction of transmission denial as a result of the checking for the monitor image D13 by the user A. The registration image D10 includes the face image of the user A.

The image-capture processor 12 similarly repeats the above-described processings for each captured image at a predetermined time interval. At this time, for example, when the face of the user A cannot be captured from an image at a certain time, the transmission image D12 may be created as a replacement image from the latest detected image or the face image of the registration image D10.

[(6) Processing Flow]

Figure 6:
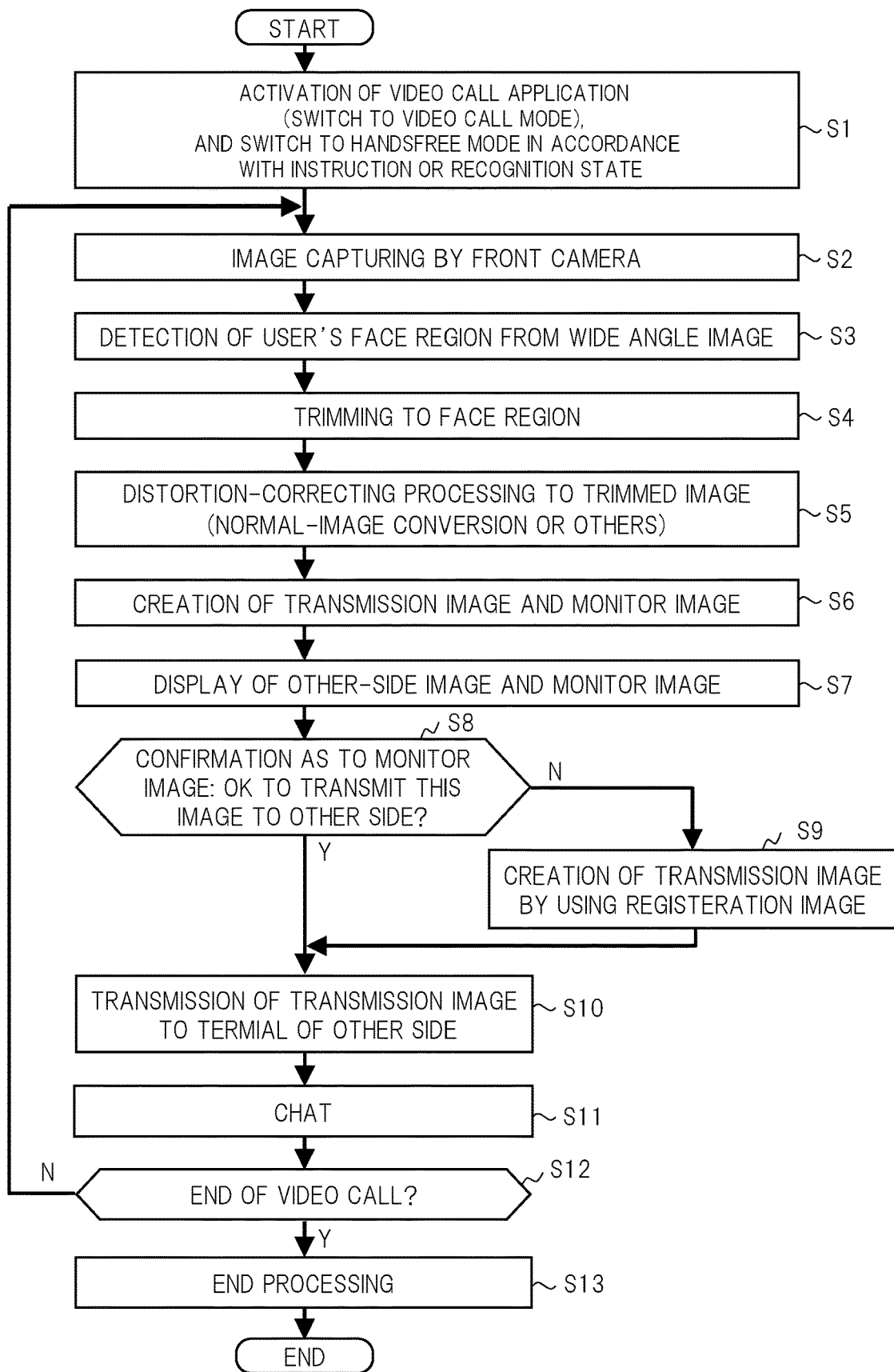
FIG. 6 is a diagram showing a processing flow in the mobile information terminal of the first embodiment.

FIG. 6 shows a processing flow of the video call function 100 in the mobile information terminal 1. The flow of FIG. 6 includes steps S1 to S13. The flow will be explained in an order of the steps below.

(S1)

First, at the step S1, when the user A makes the video call (in a case of an outbound call from the user him/herself to the other side or a case of an inbound call from the other side to the user), (the video call function 100 of) the controller 10 of the mobile information terminal 1 changes the control state of the device itself into the video call mode. More specifically, for example, when the user A needs to make the video call with (the user B of) the other side, the user A calls a telephone number of the other side. Accordingly, the video-call application program 16*b* (video-call processing execution unit 15*b*) is activated. In the video call mode, the controller 10 simultaneously controls the image capturing using the front camera C1, the voice/sound input using the microphone 17, the voice/sound output using the speaker 18, the display using the display unit 21, various communications and others in parallel.

The mobile information terminal 1 changes the control state into the video call mode in accordance with an operation of selecting either a voice call (non video call) or the video call by the user A. For example, the mobile information terminal 1 displays a selection button for selecting either the voice call or the video call on the display screen DP, and changes the state into a corresponding mode in accordance with the selecting operation. Since the front camera C1 is to be used in the video call mode, the mobile information terminal 1 sets a mode using the front camera C1 as a camera mode of the camera unit 11.

Figure 19:
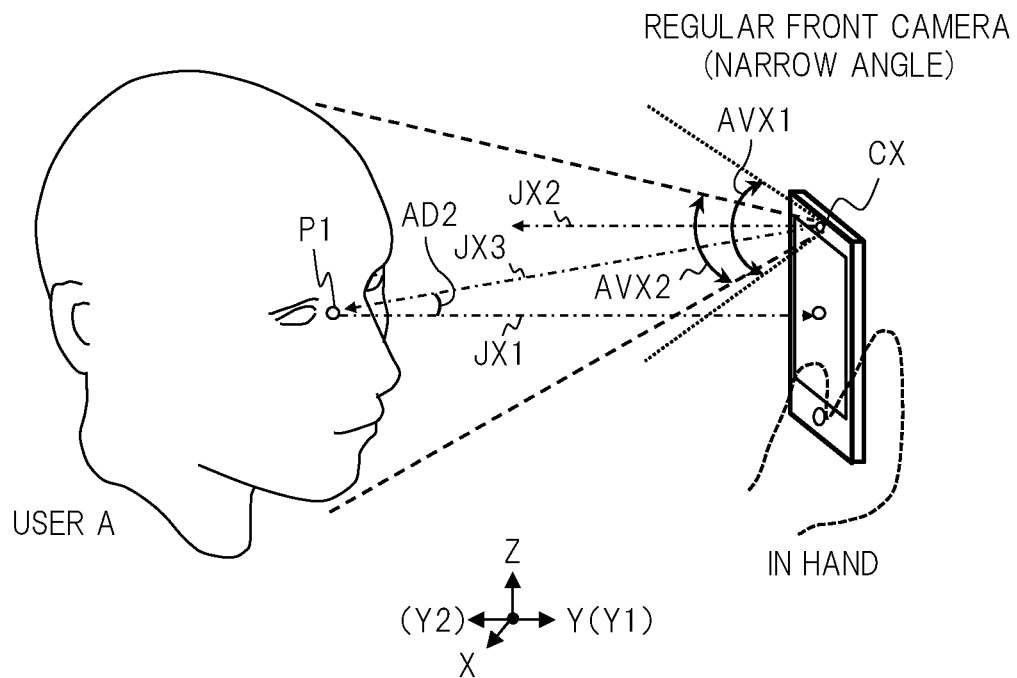
FIG. 19 is a diagram showing a positional relation in a non handsfree state or others in a case of a mobile information terminal of a comparison example of the first embodiment and another video call mode of the first embodiment.

Further, in the first embodiment, two types of the details of the video call mode are set as a regular mode (non handsfree mode) and a handsfree mode. The regular mode (non handsfree mode) is a first mode for handling the state as shown in FIG. 19. The handsfree mode is a second mode for handling the state as shown in FIG. 2. The mobile information terminal 1 selects a mode from these modes in accordance with the predetermined instruction operation by the user A or automatic recognition of the terminal state using the sensors 30. For example, the mobile information terminal 1 may display the button for selecting the regular mode or the handsfree mode on the display screen DP, and change the mode into the corresponding mode in accordance with the selection operation. Alternatively, the mobile information terminal 1 may recognize a state showing whether or not the user A is holding the enclosure in his/her hand, whether or not the user A flatly places the enclosure on the horizontal surface s0, and so on, from the detection information of the acceleration sensor 31 or others, and may automatically determine the mode in accordance with this state.

In the present example, the user A makes the video call in the handsfree state (the corresponding handsfree mode) as shown in FIG. 2. The user A sets the enclosure of the mobile information terminal 1 as shown in FIG. 2, and the mobile information terminal 1 selects the handsfree mode. In another embodiment, note that the two types of the modes may be not discriminated from each other.

(S2)

In addition to the recognition of the terminal state, the mobile information terminal 1 sets the mode (front camera mode) using the front camera C1 in the video call mode as the mode of the camera unit 11, and starts the image capturing. The image-capture processor 12 inputs the moving image from the front camera C1.

(S3)

The image-capture processor 12 of the mobile information terminal 1 detects the region (such as a region "B1" of FIG. 9) including the face of the user A from the wide angle image of the front camera C1 by using the face detecting function 201.

(S4)

The image-capture processor 12 trims a predetermined region including the face as a trimmed region (such as a trimmed region "TRM1" of FIG. 10) from the detected region in the step S3 by using the trimming function 202, and acquires the trimmed image (such as an image "GT1" of FIG. 12).

(S5)

The image-capture processor 12 performs the distortion correcting processing (normal-image converting processing 203A) to the trimmed image acquired in the step S4 by using the distortion correcting function 203. In the distortion correcting function 203, the above-described trapezoid correcting processing 203B and aberration correcting processing 203C are performed. In the manner, the corrected image D11 (such as an image "GP1" of FIG. 12) is acquired.

The image-capture processor 12 (or the controller 10) creates the transmission image D12 and the monitor image D13 (such as images "GP11" and "GP12" of FIG. 12) by using the corrected image D1 acquired in the step S5.

(S7)

In the region (the region R1 of FIG. 7) inside the display screen DP, the controller 10 displays the image, that the controller receives from the mobile information terminal 2 of (the user B of) the other side. Also, in the region (the region R2 of FIG. 7) inside the display screen DP, the controller 10 displays the monitor image D13 of the user A.

(S8)

The controller 10 asks the user A to confirm whether or not the face state of the monitor image D13 is allowed as the corresponding transmission image D12 (this processing may be referred to as transmission confirmation often). For example, inside the display screen DP, transmission confirmation information (such as a message "transmission of the image is allowed?") or an operational button (such as transmission allowance button/transmission denial button) may be displayed. The user A looks at the monitor image D13 and others, and determines whether to transmit the image content. For example, the user A pushes the transmission allowance button or the transmission denial button inside the display screen DP. In the transmission allowance case (Y) at the step S8, the flow proceeds to a step S10. In the transmission denial case (N) at the step S8, the flow proceeds to a step S9. If the user A feels uncomfortable with, for example, the eye state or others after looking at the monitor image D13 or others, the user can select the transmission denial.

(S9)

From the registration image D10, the controller 10 creates the transmission image as the replacement image. At this time, on the display screen DP, the controller 10 may ask the user A to confirm whether or not the registration image D10 can be used as the replacement transmission image D12. For example, the face image of the registration image D10 is displayed in the region R2 for use in the monitor image display in FIG. 7, and the confirmation information or the operational button is displayed.

(S10)

The controller 10 transmits data of a format for use in the video call including the transmission image D12 and others to the mobile information terminal 2 of the other side through the communication unit.

(S11)

The controller 10 process the chat (including the voice/sound input and output, the image display and others) of the video call between the user A and the user B. Note that the voice/sound data of the speaking person may be transmitted and received at any time so as to be separate from the image, as similar to a regular phone call case.

(S12)

The controller 10 checks whether or not the video call ends. For example, when the user A ends the video call, the user A pushes an end button. Alternatively, the mobile information terminal 1 receives information indicating the end from the mobile information terminal 2 of the other side. In a video-call end case (Y), the flow proceeds to a step S13. In a video-call continuation case (N), the flow returns to the step S2. In the step S2 and subsequent steps, the similar processing is repeated in a loop way for each moment. Note that the face of the user A is automatically tracked by the loop processings. Each processing of the loop is made efficient so as not to repeat the same processing as much as possible. For example, in the face detection processing in the step S3, the face in the face region that has been detected once at a certain moment is automatically tracked by detection of motion at a later moment or others.

(S13)

The controller 10 performs an end processing of the video call mode, and ends the activation (execution) of the video call application. The end processing includes reset of setting (for example, for the number of times of retry) related to the video call, the deletion of the image data and others.

Supplementations and modification examples of the above-described processing flow are as follows. In the above-described processing flow, the basically similar processings are performed to each image of the moving image of the front camera C1 in the loop way. Regarding the transmission confirmation using the monitor image D13 in the step S8, the transmission is confirmed once at the time of, for example, the start of the video call by using an image in an initial period of the moving image. If the transmission is allowed in the transmission confirmation, the transmission image D12 that is created at each moment is automatically transmitted during the video call after the allowance. The transmission confirmation is not limited to this manner, and may be performed at a periodic timing during the video call, may be performed in accordance with a predetermined user's operation, or may not be performed at all. Regarding the user setting function of the video call application, a setting for whether to perform the transmission confirmation and a setting for the timing or others are possible. When it is set that the transmission confirmation is not performed, the creation of the monitor image D13 in the step S6, the display of the monitor image D13 in the step S7, the transmission confirmation in the step S8 and others can be eliminated, and the mobile information terminal 1 automatically transmits the transmission image D12 as the transmission allowance.

After the transmission is allowed in the transmission confirmation at the beginning of the video call, the same image as the transmission image D12 that has been created first may be continuously used until the end of the video call or a next transmission confirmation.

For example, when the face region cannot be detected from the wide angle image at a certain moment in the face detection processing in the step S3, the face detection processing may be retried by using an image at a different moment in accordance with the number of times of the retry that has been previously set. Alternatively, when the face region cannot be detected or tracked, the latest detected face image or the registration image D10 may be used as the replacement image. The mobile information terminal 1 may display a message or others indicating that, for example, the face cannot be detected, inside the display screen DP, and handle this case by asking the user A to confirm whether or not the registration image D10 is to be used as the replacement transmission image D12.

When the user A performs the instruction operation indicating the transmission denial in the transmission confirmation in the step S8, the mobile information terminal 1 may use the registration image of the step S9 soon. However, the processing is not limited to this, and the flow may return to the step S5, S3 or others, and retry the processing up to a predetermined number of times of the retry. The setting for the number of times of the retry or others may be default setting of the video call application or may be changed by the user setting. By using the user setting function of the video call application, it can be set whether to use various functions including the transmission confirmation, the creation of the transmission image using the registration image and others, and the operational details of the various functions can be set, in accordance with the user's needs or operation. In accordance with the user setting, a real-time camera image or only the registration image D10 can be used from the beginning to the end of the video call.

[(7) Mobile Information Terminal—Display Screen]

FIG. 7 shows a configuration of the display screen DP and others on an X-Y plane in plan view of the front surface s1 of the mobile information terminal 1 at the time of the video call. The front camera C1 including the wide angle lens is arranged on the front surface s1 having the display screen DP of the main surfaces (front surface s1 and rear surface s2) of the flat plate enclosure of the mobile information terminal 1. In a vertically-long rectangular region of the front surface s1, the front camera C1 is arranged at, for example, a center position (point "PC1") of an upper side of a frame region out of a main region of the display screen DP.

In a region "R1" inside the display screen DP of the mobile information terminal 1, an image (other-side image) "g1" including the face of (the user B of) the other side of the chat is displayed on the basis of the control of the video call application and the image data that the mobile information terminal 1 has received from the mobile information terminal 2 of the user B.

In a predetermined partial region "R2", a monitor image "g2" including the face of the user A, that has been created on the basis of the image of the front camera C1, is displayed along with the display of the image g1 in the region R1 inside the display screen DP. This monitor image g2 is arranged so that the user A can check the state of the his/her image to be transmitted to the other side in the video call. This function that displays the monitor image g2 is not always necessary. However, when this image is displayed, this function can enhance the convenience more. The user A can check the state of his/her face image or others by looking at this monitor image g2, and can deny the transmission of the transmission image D12 having the content corresponding to this monitor image g2 if needed.

In a display example of FIG. 7(A), the other-side image g1 is displayed in the main region R1 corresponding to almost all of the display screen DP, and the monitor image g2 is displayed in a region "R2" at a position being near the front camera C1 and overlapping an up right corner of the region R1.

In another display example of FIG. 7(B), the main region R1 for displaying the other-side image g1 is arranged at a position being near the front camera C1 and an upper side of the display screen DP, and the monitor image g2 is displayed in a separate region R2 on a lower side of the region R1. The display is not limited to this, and various display methods are applicable and can be changed by the user setting function.

In the display examples of FIG. 7, the monitor image g2 in the region R2 has a smaller size than that of the other-side image g1 in the region R1. The size is not limited to this, and the size of the monitor image g2 in the region R2 can be also set and changed. Alternatively, for example, only the monitor image g2 can be enlarged and displayed in accordance with a touch operation on the display screen DP.

[(8) Image Example, Processing Example]

Each of FIGS. 8 to 12 shows the image example or the processing example of the face detection, the trimming or the distortion correction on the basis of the wide angle image of the front camera C1 of the mobile information terminal 1.

(1)

Figure 8:
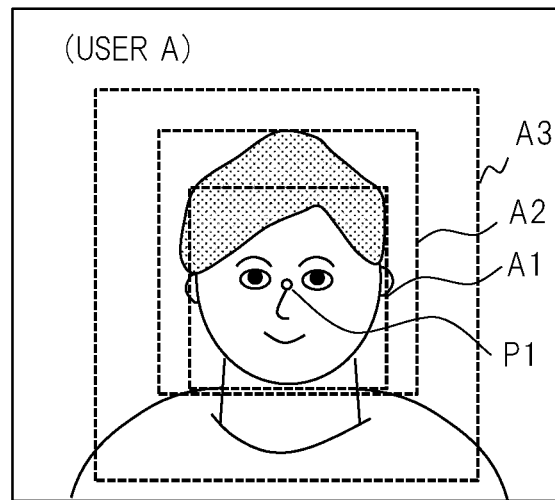
FIG. 8 is a diagram showing an example of an image acquired by using a regular camera and capturing a front side image of a face, in the mobile information terminal of the first embodiment.

First, for explanation in comparison, FIG. 8 shows an example of an image (regular image) acquired when the image of the face of the user A is captured from a front side by the regular camera C2. This example is in a case of the regular image having a square size. A center point or a typical point of the face or the head of the user A is indicated by the point P1. A middle point between the eyes or others may be the point P1. The drawing schematically illustrates a face region "A1", a head region "A2" and a region "A3". The face region A1 is a region that is captured so as to include the face (including eyes, a nose, a mouth, ears, skin and others). The head region A2 is a region that is wider than the face region A1 and is captured so as to include the head (including hear and others). The region A3 is a region that is wider than the face region A1 and the head region A2 and is captured so as to also include a peripheral region having a certain size out of the face or the head. The region A3 may be, for example, a region from the point P1 to a point having a predetermined distance therefrom or a region that is captured in accordance with a ratio of the face region A1 in the region A3 or others. A shape of each region is not limited to the rectangular shape, and may be an elliptic shape or others. In a case of an image that is captured in a positional relation of oblique upward view from the camera as shown in FIG. 2, a practical image content slightly becomes a trapezoidal image content as shown in FIG. 15(B).

(2)

FIG. 9 schematically shows the face region detection and an outline of the wide angle image G1 captured by the front camera C1. This wide angle image G1 includes a circular region. A point "PG1" indicates a center point of the wide angle image G1, and corresponds to an optical axis direction "J2". Positional coordinates inside the wide angle image G1 is indicated by (x, y). A region (face region) "B1" illustrated with a broken line frame schematically indicates a rectangular region corresponding to the face region A1. Similarly, a region (head region) "B2" indicates a rectangular region corresponding to the head region A2, and a region "B3" indicates a rectangular region corresponding to the region A3. Further, a region "B4" is in a case in which the region is larger than the region B3 and has a rectangular region that is large enough for the processing. Each region is illustrated to be rectangular. However, the shape is not limited to this, and may be a shape fitted into the coordinate system of the wide angle image.

In the wide angle image G1 of FIG. 9, on the basis of the positional relation as shown in FIG. 2, the face of the user A or others is projected in a partial region inside the wide angle image G1, more particularly a region near a position (point P1) below the center point PG1. As seen in the drawing, the distortion depending on the wide angle lens is caused in the entire region including the face inside the wide angle image G1 that is captured through the wide angle lens of the front camera C1. In the wide angle image G1, the distortion is larger at a position outer than the center position (point PG1) often.

The face detecting function 201 detects the region including the face from the wide angle image G1. The face detecting function 201 detects, for example, the face region B1 or the head region B2.

(3)

Figure 10:
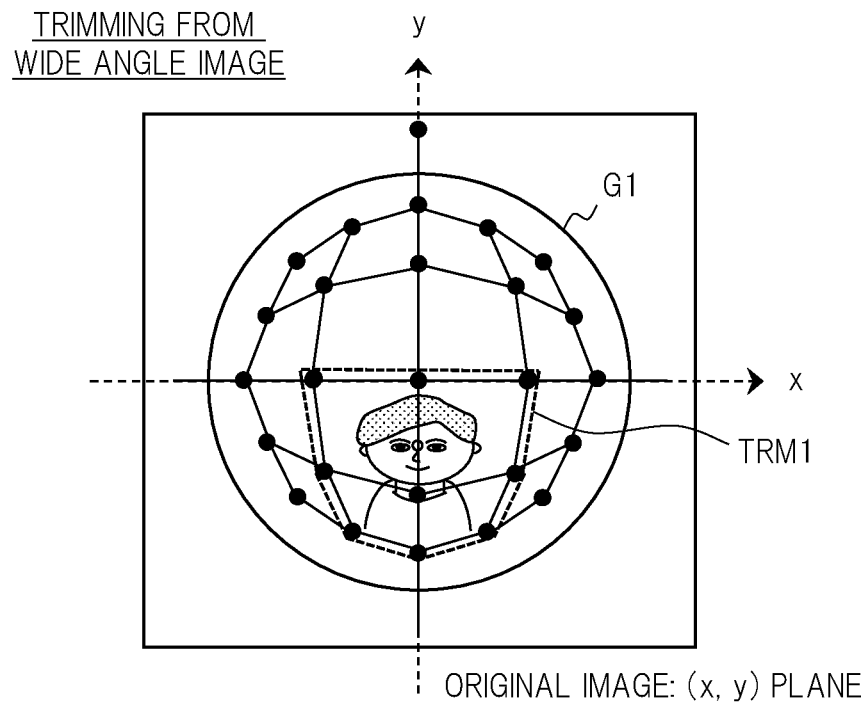
FIG. 10 is a diagram showing an example of trimming from a wide angle image in the mobile information terminal of the first embodiment.

FIG. 10 shows the wide angle image G1 of FIG. 9 overlapped with a state of an original image of FIGS. 13 and 14 described later on the (x, y) plane. The trimming function 202 sets the region to be trimmed corresponding to the face region B1, the region B3 and others, and acquires the trimmed image from the wide angle image G1. In an example of FIG. 10, a shield-shape region corresponding to the region B3 in the coordinate system of the original image on the (x, y) plane is set as the trimmed region "TRM1" (illustrated with the broken line frame) in the wide angle image G1. The shield shape of the trimmed region TRM1 is a shape, for example, an x-directional width of which is smaller as being closer to an outside from the center in the y direction.

(4)

Figure 11:
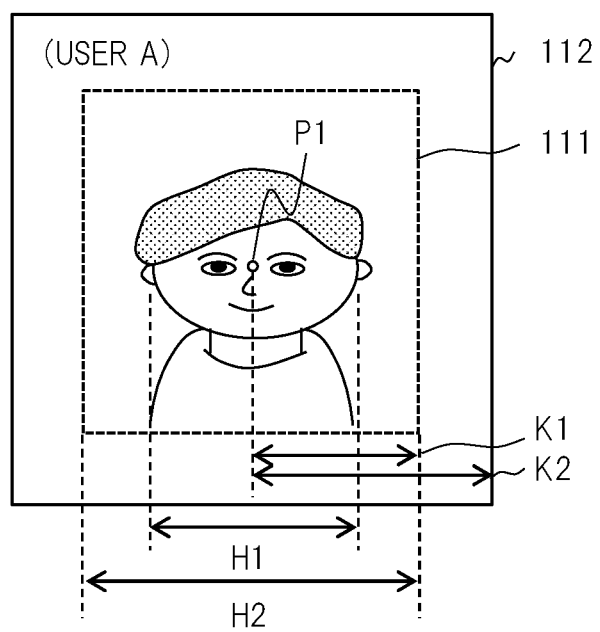
FIG. 11 is a diagram showing an example of a trimmed image (in a case of rectangular shape) in the mobile information terminal of the first embodiment.

For explanation in comparison, FIG. 11 shows an example of the trimmed image to be trimmed as the rectangular (right-angle quadrangular) trimmed region from the wide angle image G1 of FIG. 9. A region "111" indicates a rectangular region including the head and a peripheral portion of the head. A region "112" indicates an example of a rectangular region to be larger than the region 111 for the processing. In the region 111, a lateral width "H1" of the face region and others and the entire lateral width "H2" are schematically illustrated. Regarding determination of a size of the region 111, the entire lateral width H2 is set so as to have a predetermined ratio (H1/H2) with respect to the lateral width H1 of the face region and others. For example, "H1/H2=½, ⅔ or others" is set. This ratio can be set by the user. Alternatively, the sizes of the regions 111 and 112 may be determined when these predetermined distances "K1" and "K2" from the center point P1 of the face region in the lateral and longitudinal directions and others are set.

(5)

FIG. 12 shows examples of the trimmed image and the distortion correction. FIG. 12(A) shows a trimmed image "GT1" corresponding to the trimmed region TRM1 of FIG. 10. The drawing shows an example in a case in which a trimmed region "TRM2" and a trimmed image "GT2" are set to be larger than the trimmed region TRM1 and the trimmed image GT1 for the processing. On the (x, y) plane of the original image, the trimmed region TRM1 is set to have a size including the peripheral region of the face (such as a size including an upper body) of the user A.

FIG. 12(B) shows a planarized image "GP1" that is an image resulted from the distortion correction for the trimmed image GT1 of FIG. 12(A). The distortion correcting function 203 performs the normal-image converting processing 203A (FIG. 14) to the trimmed image GT1. As a result, the planarized image GP1 having almost no distortion is acquired. The planarized image GP1 has a rectangular (right-angle quadrangular) plane "PL1". A plane "PL2" indicates a plane of a planarized image that is similarly acquired in the case of the trimmed image GT2. Particularly, an image "GP11" and an image "GP12" are indicated as examples acquired when a partial region is extracted from the planarized image GP1. The image GP11 corresponds to the face region, and the image GP12 corresponds to the head region and the peripheral region of the head.

The image-capture processor 12 acquires the planarized image GP1 as the corrected image D11. Further, the image-capture processor 12 extracts the partial image GP11 or others from this planarized image GP1, and appropriately processes the partial image, so that the monitor image D13 may be created.

The image-capture processor 12 performs the normal-image converting processing 203A so as to change the wide angle image (original image) G1 into the state without the distortion by using the distortion correcting function 203. At this time, when a calculation of the normal-image converting processing 203A is performed for the entire region of the circular shape of the original image, there is a concern about a large calculation amount. Therefore, in the first embodiment, as the processing example, the image-capture processor 12 limitedly performs the calculation of the normal-image converting processing 203A and others for the image of the partial region trimmed from the wide angle image (original image) G1 as described above.

[(9) Distortion Correction]

Figure 13:
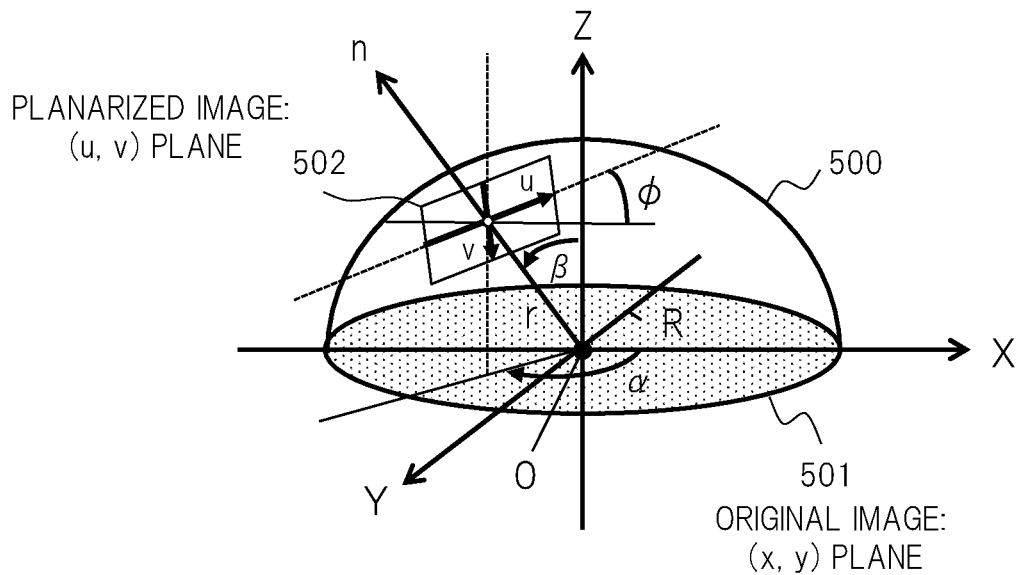
FIG. 13 is a diagram showing an example of a model and a coordinate system using a wide angle lens in the mobile information terminal of the first embodiment.
Figure 14:
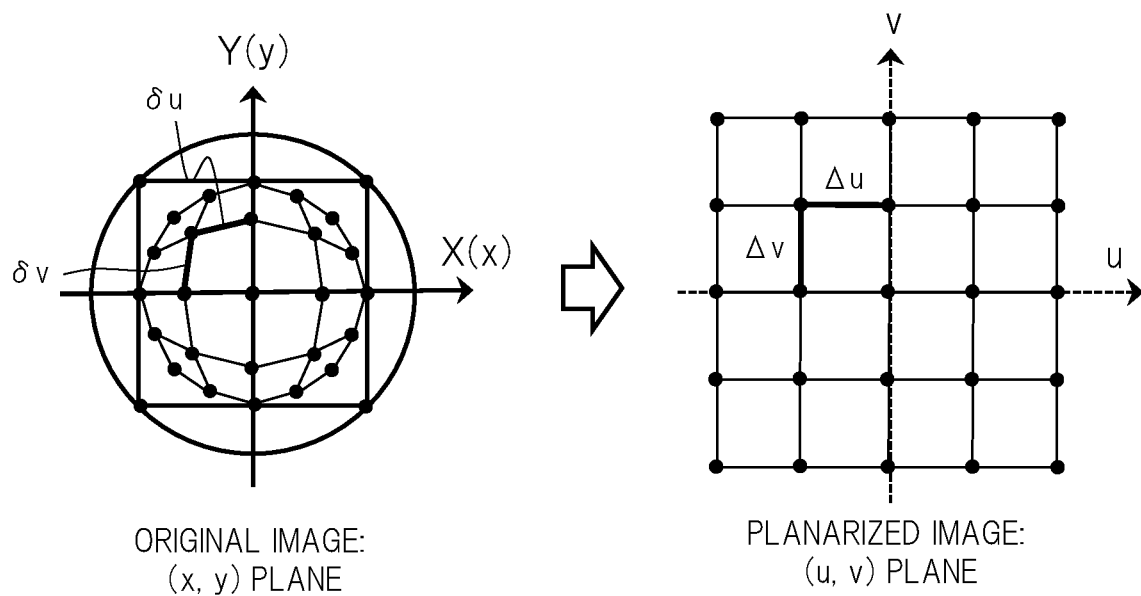
FIG. 14 is a diagram showing normal-image conversion in the mobile information terminal of the first embodiment.

With reference to FIGS. 13 and 14, a distortion correcting method of correcting the distorted wide angle image captured by the front camera C1 into the planarized image without the distortion will be explained.

FIG. 13 shows a model and a coordinate system of the normal-image conversion in the case of the usage of the wide angle lens of the front camera C1. The drawing shows a semispherical plane 500 corresponding to the wide angle lens, a planar image-capture plane 501 of the camera sensor, a planarized image 502 and others. The image-capture plane 501 is also illustrated as the (x, y) plane of the original image. The planarized image 502 corresponds to the captured image of the target object, and is illustrated as a (u, v) plane. The wide angle lens has a nearly spherical shape having a radius or others depending on an angle of view or others, and is illustrated as the semispherical plane 500. The image-capture plane 501 is arranged at a position in vertical to a Z-directional axis in the image capture range of the semispherical plane 500. The drawing illustrates an origin "O", a radius "R" and three-dimensional coordinates (X, Y, Z) of the semispherical plane 500 or the image-capture plane 501. A bottom plane of the spherical coordinate system (semispherical plane 500) corresponds to the image-capture plane 501 on the camera sensor, and is illustrated as the (x, y) plane of the original image.

on the basis of the model of FIG. 13, the mobile information terminal 1 can determine a distance from a center position, an angle, a range and others regarding the position and the angle of view AV2 in the image capturing for the face of the user A who is the image-capture target object, the position and the angle of view being inside the angle of view AV1 of the wide angle image captured through the wide angle lens of the front camera C1. Therefore, the image-capture processor 12 can create the planarized image, the distortion of which has been removed or reduced, from the distorted face image by performing the distortion correcting processing (the normal-image conversion of FIG. 14) based on the model of FIG. 13.

As shown in FIG. 2 described above, the angle of view AV1 depending on the wide angle lens of the front camera C1 is about 180 degrees that is large. An optical image that is acquired by capturing and projecting an object (such as the face) so as to have a nearly spherical shape (semispherical plane 500) corresponding to the wide angle lens is received by a camera sensor having a plane indicated as the image-capture plane 501. Then, an image (wide angle image) on the camera sensor is distorted as shown on a left side of FIG. 14. A relation (indicated as an angle "β") between a camera-sensor front side angle (Z direction) and an image-capture direction (n direction) becomes tighter as being closer to the outside from the center.

On the left side of FIG. 14, the distortion on the (x, y) plane of the original image is schematically illustrated. On the (x, y) plane, a unit region of the coordinate system is not right-angle quadrangular (e.g. distortion amounts δu and δv). On a right side of FIG. 14, the (u, v) plane is illustrated as the planarized image 502. This (u, v) plane corresponds to an image to be extracted as the image without the distortion. On the (u, v) plane, the unit region of the coordinate system is right-angle quadrangular (e.g. Δu and Δv).

A focal length of the wide angle lens and specifications of a lens shape are previously obtained. Therefore, the coordinate conversion from the spherical image (original image) into the planar image (referred to as planarized image) is easily achieved. To this coordinate conversion, the normal-image conversion as shown in FIG. 14 is applicable. By this normal-image conversion, the image with the distortion is converted into the image without the distortion as being originally viewed by human eyes, and the normal-image conversion is used for correcting the distortion on, for example, a fisheye lens or others. By this normal-image conversion, a pixel at each point on the (x, y) plane of the original image illustrated on the left side of FIG. 14 is converted into a pixel at each point on the (u, v) plane of the planarized image illustrated on the right side of the same. The conversion will be described in details below.

As shown in FIG. 13, regarding the direction "n" in the image capturing for the target object, an azimuth angle, a zenith angle and a rotational angle of the plane (planarized image 502) to be extracted are indicated by "α", "β" and "φ", respectively. A magnification of the lens is indicated by "m". Then, by a publicly-known expression of the normal-image conversion, the following expressions 1 and 2 are led. Terms "A", "B", "C" and "D" in the expressions are expressed by expressions 3 to 6, respectively.

$x = R(uA - vB + mR \sin \beta \sin \alpha)/\sqrt{(u^2 + v^2 + m^2 R^2)}$      Expression 1:

$y = R(uC - vD + mR \sin \beta \cos \alpha)/\sqrt{(u^2 + v^2 + m^2 R^2)}$      Expression 2:

$A = \cos \varphi \cos \alpha - \sin \varphi \sin \alpha \cos \beta$      Expression 3:

$B = \sin \varphi \cos \alpha + \cos \varphi \sin \alpha \cos \beta$      Expression 4:

$C = \cos \varphi \sin \alpha + \sin \varphi \cos \alpha \cos \beta$      Expression 5:

$D = \sin \varphi \sin \alpha - \cos \varphi \cos \alpha \cos \beta$      Expression 6:

Each pixel of the original image is converted into each pixel of the planarized image in accordance with calculations based on the above-described expressions, so that the distortion can be removed. The distortion amounts δu and δv at each pixel position on the (x, y) plane of the original image are converted into the state (Δu and Δv) without the distortion as shown in the square unit region on the (u, v) plane of the planarized image.

[(10) Trapezoid Correction]

FIG. 15 show an image example of the trapezoid correcting processing 203B and others. When the mobile information terminal 1 is flatly placed on the horizontal surface S0 as shown in FIG. 15(A), the image of the face of the user A is captured in the direction J3 that is obliquely upward from the front camera C1. Therefore, at the angle of view AV2 of the image in the face capturing, a lower portion (such as a chin) of the face or the head in the Z direction is closer than an upper portion thereof in the Z direction. For example, a distance "DST1" indicates a distance between the position PC1 of the front camera C1 and the upper portion of the head, and a distance "DST2" indicates a distance between the position PC1 of the front camera C1 and the lower portion of the head. A relation "DST1>DST2" is established.

Therefore, inside the captured image (wide angle image), as shown in FIG. 15(B), the face region of the user A or others has a trapezoid image content (referred to as trapezoid image). In a trapezoid image 151, an upper side in the Z direction is smaller than a lower side. As the trapezoid image 151, the normal-image corrected shape of the wide angle image without the distortion is schematically shown. The trapezoid image 151 is projected so that, for example, a head top side is relatively small while a chin side is relatively large.

If the transmission image D12 is made of this trapezoid image, (the user B of) the other side possibly slightly feels uncomfortable when looking at this transmission image D12. Accordingly, in order to create a more favorable transmission image D12, the trapezoid correcting processing 203B is applied. By using the image of the front camera C1 and the sensors, the mobile information terminal 1 can determine a state such as a range of an elevation angle (angle θ1) caused when the point P1 that is the typical position of the face of the user A is viewed from the position PC1 of the front camera C1. The image-capture processor 12 performs the trapezoid correcting processing 203B on the basis of the determined information.

FIG. 15(C) shows an image 152 resulted from the trapezoid correction for FIG. 15(B). This image 152 is a right-angle quadrangular image so that an upper side and a lower side have the same length as each other. When the transmission image D12 is created by using this image 152, the transmission image for (the user B of) the other side apparently looks like the image of the face of the user A viewed from the front side.

[(11) Monitor Function, Image Correcting Function]

As shown in FIG. 7, the mobile information terminal 1 of the first embodiment also has the monitor function for the image of the user A him/herself. The mobile information terminal 1 displays a monitor image "D13" of the user A corresponding to the transmission image D12, inside the display screen DP, and asks the user A to confirm whether it is OK or not to set the face state of the monitor image D12 for the transmission image. In this monitor function, the user A looks at the monito image D13, and, if the user A feels uncomfortable or does not satisfy with the distortion-corrected his/her face image, the user A can deny the transmission of the transmission image D12 corresponding to this monitor image D13. The mobile information terminal 1 does not transmit the transmission image D12 corresponding to this monitor image D13 when receiving an operation of the instruction on the transmission denial.

In this case, the mobile information terminal 1 may create a new transmission image D12 based on the registration image D10 in place of this transmission image D12, change the transmission image from the original transmission image D12 into the new transmission image, and transmit the new transmission image. The mobile information terminal 1 may use the face image of the registration image D10 as it is, or may create the new transmission image D12 by processing the registration image. The registration image D10 may be a still image or a moving image that is acquired when the user A captures his/her face image by using an optional camera, or may be not the face image but another optional image (such as an icon image or an animation image).

The mobile information terminal 1 may have an image altering function as another function. The mobile information terminal 1 alters the face image by using this function when receiving the instruction on the transmission denial for the tentatively-created corrected image D11 (monitor image D13, transmission image D12). At this time, the mobile information terminal 1 performs an alteration processing to the corrected image D11 on the basis of the face image of the registration image D10, and creates an altered face image. For example, the mobile information terminal 1 creates the altered face image by processing an image state of both eyes inside the face image so that a line-of-sight direction is oriented to the front side. Note that the altered face image may be also displayed inside the display screen DP, and be confirmed by the user A for the transmission.

Specific examples include a case in which the eye image of the face image of the user A captured at certain timing is not captured well, such as a case in which the line-of-sight direction significantly shifts from the front side (in the direction J3). In this case, the mobile information terminal 1 alters the eye image of the face image so as to be synthesized with or changed to an eye image of the registration image D10. In this manner, the eye image of the altered face image is oriented to the front side.

When the user A issues the instruction on the transmission denial after checking the monitor image D13, the mobile information terminal 1 may tentatively reset a processing result (the corrected image D11, the transmission image D12) acquired at this timing, and retry the creation of the transmission image D12 on the basis of an input image acquired at a different timing. The number of times of the retry in this case can be also set. When a sufficient image eventually could not have been acquired as a result of the retry performed a predetermined number of times (when the user A has not issued the instruction on the transmission), the mobile information terminal 1 may set the face image of the registration image D10 as the transmission image D12.

The mobile information terminal 1 may switch the image to be the transmission image D12 between an image created in real time and the face image of the registration image D10 in accordance with the touch operation of the user A onto the region inside the display screen DP.

[(12) Registration Function and Registration Image]

By using the registration function and the registration image D10, accuracy of the face detection and others can be increased, and various accessory functions can be used. The data of the registration image D10 is stored in the memory 13, the external memory 16 or others. A method of registering the face image of the user A as the registration image D10 is as follows. For example, the user A operates the registration function of the user setting functions of the video call application, captures the image of his/her face in the front side direction by using the regular camera C2 (or a front camera "C3" of a second embodiment described later), and registers the face image without the distortion as the registration image D10. Note that the registration image D10 may be created by using the front camera C1 and the distortion correcting function 203, or the registration may be performed by reading data from another camera or external device.

The registration image D10 may include not only the face image that is acquired by capturing the image of the face of the user A in the front side direction but also a plurality of images that are acquired by capturing the face in various different directions. In this case, even when the user A changes the direction of the face or moves during the video call, the face detecting function 201 of the mobile information terminal 1 can detect the state of the face at this time by using this registration image D10. The image altering function of the mobile information terminal 1 can perform the alternation processing in accordance with the state of the face at this time.

When the user A checks the monitor image D13 inside the display screen DP, denies the transmission, and uses the registration image D10 instead, a face image that is selected by the user A from the plurality of face images of the registration image D10 can be used and set as the transmission image D12.

The registration image D10 may include not only the face image of single user A but also a plurality of face images of a plurality of different users who possibly use the mobile information terminal 1 and make the video call.

[(13) Personal Recognizing Function]

In the first embodiment, the face detecting function 201 of the image-capture processor 12 particularly also has a function (personal recognizing function "201B") that recognizes a personal face of a specific user. The mobile information terminal 1 may detect an unspecific face region from the wide angle image, and besides, recognize a personal face of a specific user. In this case, the mobile information terminal 1 may detect only the face of the specific user, and create the transmission image D12.

The face detecting function 201 detects, for example, an optional face region from the wide angle image. Then, in the personal recognizing function 201B, this face region is compared with a face image for use in personal recognition of the user A that is previously registered as the registration image D10, and is identified. In the personal recognizing function 201B, as a result of the comparison, it is determined on the basis of similarity whether or not the face region inside the wide angle image corresponds to the face of the specific user A. The personal recognizing function 201B outputs personal recognizing result information.

The mobile information terminal 1 adopts the control of the video call function in the handsfree state only when the face region corresponds to the face of the specific user A, and creates, for example, the transmission image D12. When the plurality of user's faces are projected inside the wide angle image, the transmission image D12 targeting at only the face of the specific user A can be created. For example, as the target, it is unnecessary to handle faces of passengers inside the wide angle image who are merely in a background of the user A. Note that the mobile information terminal 1 may not have the personal recognizing function 201B as a modification example. The image-capture processor 12 may recognize a specific personal face from the image before or after the distortion correction.

[(14) Face Tracking Function]

In the first embodiment, (particularly the face detecting function 201 of) the image-capture processor 12 also has a function (face tracking function) that automatically tracks motion of the user's face region on the basis of the moving image (the plurality of images acquired at a predetermined rate) of the front camera C1. Even if the user sightly moves, when the wide angle front camera C1 is used, the mobile information terminal 1 can track the face region by using the face detection as long as the face region is inside the wide angle image. The mobile information terminal 1 can create the transmission image D12 by tracking the user's face so as to be put at the center of the image.

During the video call, the user A may not always stay at the same position, and may be moving. From the moving image, the image-capture processor 12 detects the face region of the user A for each wide angle image at each predetermined timing. For example, the face region is tentatively detected at certain timing by using the face detecting function 201, and then, another face region is searched around the detected face region at a later timing, so that the motion of the face region is determined. In this manner, while the image processing amount is suppressed, the face region of the user A can be continuously tracked in time series even when the user is moving.

During the video call in the state of FIG. 2, (particularly the face of) the user A may move from an initial position. For example, the user A is temporarily away from the initial position, and then, returns to the initial position in some cases. Even in this case, the image-capture processor 12 tracks the moving face region as much as possible by using the face tracking function. When the face of the user A is not projected inside the wide angle image, in other words, when the face region cannot be tracked, the image-capture processor 12 handles this situation, for example, as follows after that. The image-capture processor 12 handles this situation by using the latest detected image and/or the already-created transmission image D12. Alternatively, the image-capture processor 12 handles this situation by temporarily replacing the face image with the face image of the registration image D10. When the face of the user A is projected inside the wide angle image again, the image-capture processor 12 detects the face region, and then, similarly tracks the face region. Even when the face of the user A is temporarily covered with an optional object, the image-capture processor 12 can similarly handle this situation by using the face tracking function.

[(15) Another Usage state, Arrangement State and Guide Function]

Figure 16:
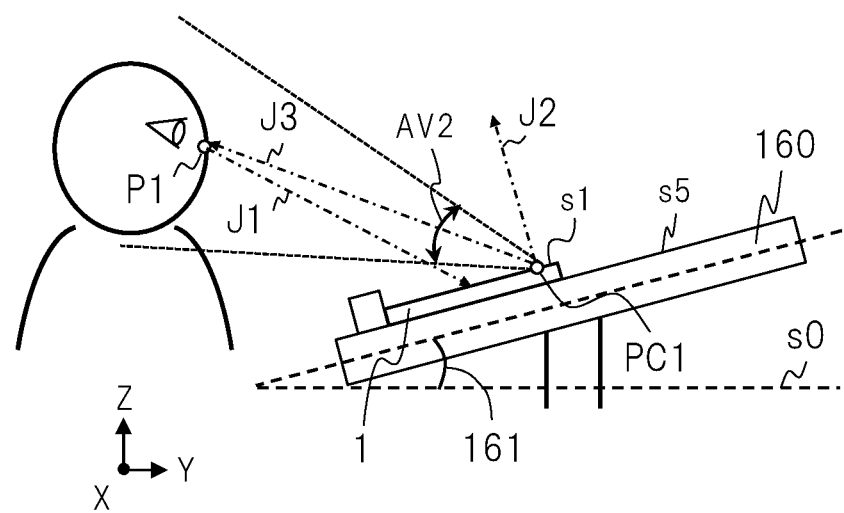
FIG. 16 is a diagram showing a first example of another usage state in the mobile information terminal of the first embodiment.
Figure 17:
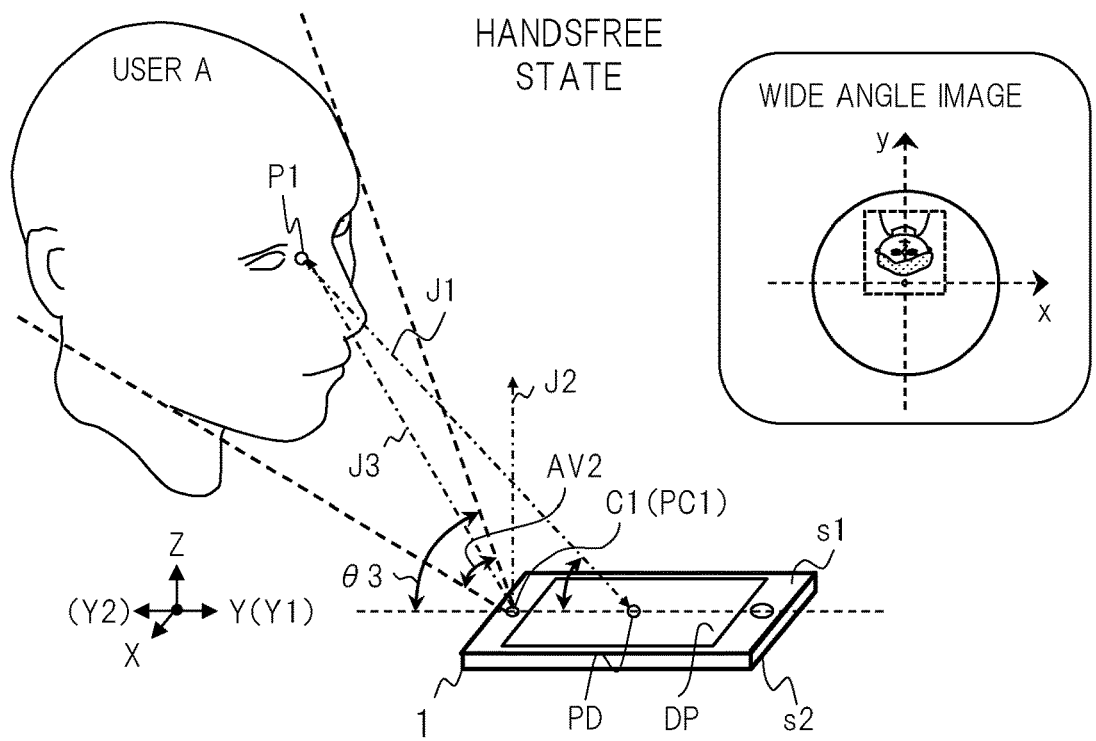
FIG. 17 is a diagram showing a second example of another usage state in the mobile information terminal of the first embodiment.
Figure 18:
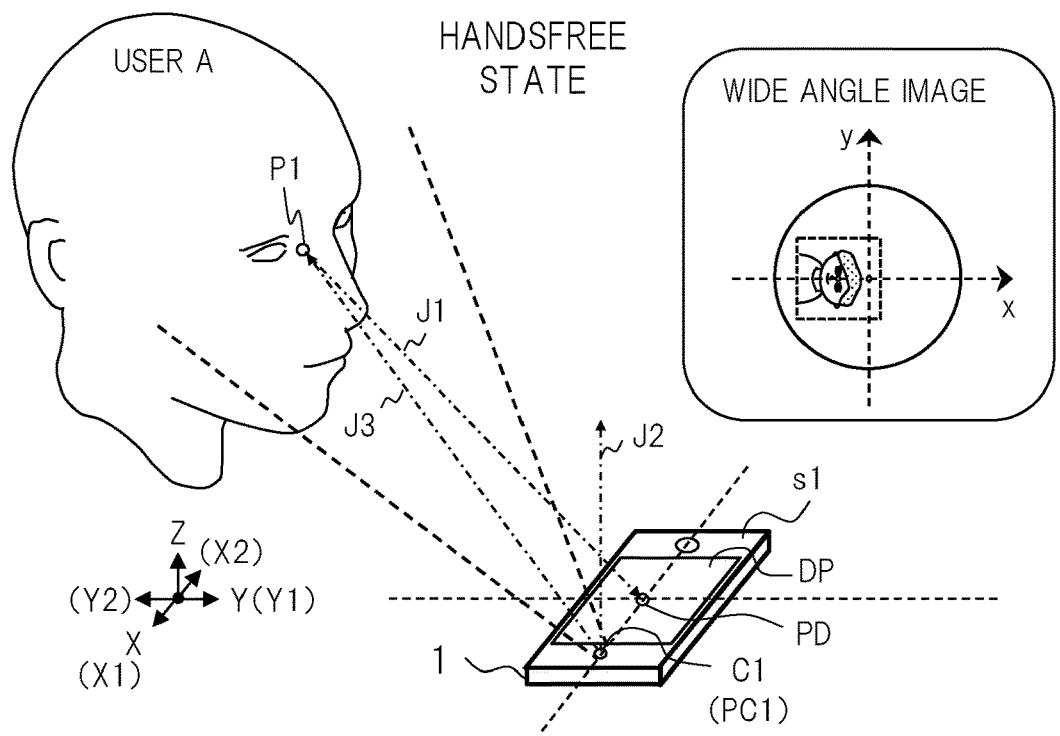
FIG. 18 is a diagram showing a third example of another usage state in the mobile information terminal of the first embodiment.

Each of FIGS. 16 to 18 shows an example of another usage state and arrangement state of the mobile information terminal 1 of the first embodiment. A terminal arrangement state during the video call in the handsfree state made by the user A is not limited to the state of FIG. 2, and the following states are also applicable.

FIG. 16 shows a first state example. FIG. 16 shows an optional object 160 such as a stand having a tilt surface "s5" tilting by certain angle 161 from the horizontal surface s0. The user A flatly places the enclosure of the mobile information terminal 1 along the tilt surface s5 of the object 160 such as the stand. The object 160 and the angle 161 are not particularly limited as long as making the enclosure remain stationary. In this state, the user A looks at the display screen DP of the enclosure in front of the user. The front camera C1 is arranged in the optical axis direction J2 depending on the angle 161. The front camera C1 captures the image of the face (point P1) of the user A at the angle of view AV2 in the direction J3. As seen in the drawing, even when the enclosure is placed to tilt by certain degree, the video call in the handsfree state can be made as similar to FIG. 2.

As a second example in FIG. 17, the position PC1 of the front camera C1 on the front surface s1 of the enclosure is a position in a direction "Y2" closer to the user A when being viewed from the user A. In this case, the image-capture direction J3 (angle θ3) of the front camera C1 is different from that of the state of FIG. 2. For example, the elevation angle is larger. In this case, inside the wide angle image, the face region of the user A is reversely projected. The image-capture processor 12 can recognize the reverse state because of the wide angle image. The image-capture processor 12 appropriately performs an image reverse processing, and displays the monitor image D13 having appropriate upper and lower directions inside the display screen DP.

As a third example in FIG. 18, the longitudinal direction of the enclosure is arranged in the X direction (a right-and-left direction for the user A). In this case, the position PC1 of the front camera C1 on the front surface s1 is a position on either the right or the left side (for example, in a direction "X1") in the X direction for the user A. The image-capture processor 12 appropriately performs an image rotation processing, and displays the monitor image D13 having the appropriate directions inside the display screen DP.

In the first embodiment, the arrangement state of FIG. 2 is particularly recommended for the user. However, even in each of the above-described arrangement states, the video call function can be substantially similarly achieved. In the first embodiment, the arrangement state of the mobile information terminal 1 on the horizontal surface s0 and the positional relation between the mobile information terminal 1 and the user A can be substantially similarly handled by the front camera C1 even in any state of FIGS. 2, 17, 18 and others. Therefore, the user A can freely change the terminal state and his/her own position to some extent during the video call, and thus, this situation has high convenience.

The mobile information terminal 1 may have a function (guide function) that recommends or guides the arrangement state of the enclosure to the user. The mobile information terminal 1 recognizes the arrangement state of the enclosure by using the camera image and the sensors 30. Inside the display screen DP, the mobile information terminal 1 may display or output voice/sound of, for example, guide information (such as a message "placing the camera deeper (farther) is recommended") so as to recommend the arrangement state of FIG. 2.

When the arrangement state of the enclosure is inappropriate, the mobile information terminal 1 may output guide information indicating the inappropriate state. For example, when the angle θ3 related to the direction J3 in which the image of the face (point P1) of the user A is captured from the position PC1 of the front camera C1 is not within a predetermined angle range (when the elevation angle is too small or too large), the mobile information terminal 1 may output guide information indicating that the arrangement position is inappropriate.

Alternatively, it is also assumed that the positional relation between the mobile information terminal 1 and the user A is a position relation in which the face cannot be recognized by the front camera C1. In this case, in order to make the appropriate positional relation (between the terminal position and the user position), the mobile information terminal 1 may output guide information to the user A. For example, the mobile information terminal 1 may output information indicating that the position or the arrangement state of the mobile information terminal 1 is to be changed or information indicating that the position of the face of the user A is to be changed. At this time, the mobile information terminal 1 may output instruction information indicating which direction or position the mobile information terminal 1 or the face is to be changed in, when recognizing the positional relation with the user A.

[(16) Comparison Example—Non Handsfree State]

FIG. 19 shows the cases of the general video call mode (general mode) and the non handsfree mode generating the non handsfree state as another video call mode in the first embodiment in the mobile information terminal of the comparative example. In this state and mode, the user A holds the enclosure of the mobile information terminal in his/her hand, and the user's both hands do not freely move. In the example of FIG. 19, the enclosure vertically stands up. A front camera "CX" on the front surface of the enclosure is a regular camera having a regular lens with a regular angle (so-called narrow angle) of view. This regular angle of view is narrower than the angle of view AV1 of the front camera C1. The drawing illustrates an optical axis direction "JX2" of the front camera CX. In this example, this direction is oriented to the direction Y2 that is closer to the user in the Y direction. An angle of view "AVX1" of the front camera CX is in, for example, an angle range from 45 degrees to 135 degrees. The drawing illustrates an angle of view "AVX2" corresponding to the face-image capture range in the angle of view AVX1.

The drawing illustrates a line-of-sight direction "JX1" of the user A, a face-image capture direction "JX3" of the front camera CX and an angular difference "AD2" made by the two directions. The larger such an angular difference is, the lower a direction of the line of sight of the user A inside the image is. The eyes of the user A are not oriented to the front side when being viewed from (the user B of) the other side.

On the other hand, an angular difference "AD1" in the case of the handsfree mode of FIG. 2 in the first embodiment can be made smaller than the angular difference AD2 in the comparative example. Therefore, the line-of-sight direction of the user inside the image is oriented to be closer to the front side in the case of the handsfree mode in the first embodiment than the regular mode. In this manner, the line-of-sight direction of the user A is oriented to the front side when being viewed from (the user B of) the other side, and therefore, more natural and less uncomfortable video call can be made.

Note that the front camera CX of the related-art mobile information terminal has the regular lens, and has a limited image-capture allowable range. Therefore, the following consideration and time and effort are necessary in order to make the video call in the non handsfree state so that the user A holds the enclosure in his/her hand while using this front camera CX for the video call function. In order to appropriately capture the face image of the user A him/herself and give the image to the other side, the user A needs to keep the positional relation between the face and the enclosure while adjusting the orientation of the enclosure by his/her hands. On the other hand, in the mobile information terminal 1 of the first embodiment, the video call can be made in the handsfree state by using the front camera C1, and therefore, the above-described consideration and time and effort are unnecessary.

When the regular mode is used in the first embodiment, note that the face of the user A is projected at a position near the center of the wide angle image of the front camera C1. In this regular mode, the distortion correcting processing and others in the mobile information terminal 1 may be eliminated, and this operation can serve a different effect in a different operation from the handsfree mode.

[(17) Effects and Others]

As described above, by the mobile information terminal 1 having the video call function of the first embodiment, the more favorable readiness handsfree video call is achieved. Since the user can make the video call while the user's both hands can freely move, the video call is also highly convenient. Note that the front camera C1 on the front surface s1 of the mobile information terminal 1 is not limitedly exclusive to the video call, and is generally applicable to other intended uses (such as self photographing). In the first embodiment, the handsfree video call is achieved by suitably using the front camera C1. In the handsfree video call, it is unnecessary to deform the enclosure of the mobile information terminal 1 of the first embodiment, and it is unnecessary to use another fixing tools or others, either. Therefore, this mobile information terminal 1 has good readiness and high general versatility.

The optical axis of the camera (front camera C1) of the mobile information terminal 1 of the first embodiment is oriented to a general direction that is vertical to a plane, and is different from that of a related art example having an oblique optical-axis direction (such as 45 degrees) in the camera, that of a related art example having a mechanically-driven, and thus, changeable optical-axis direction in the camera and others, and therefore, the mounting of the mobile information terminal 1 is simplified.

Second Embodiment

With respect to FIGS. 20 and 21, a mobile information terminal of a second embodiment of the present invention will be explained. A basis configuration of the second embodiment is similar to that of the first embodiment, and the following is explanation about a different configuration portion of the second embodiment from the first embodiment. A mobile information terminal 1 of the second embodiment includes a plurality of front cameras C1 on the front surface s1 of the enclosure, and separately selectively uses these cameras.

Figure 20:
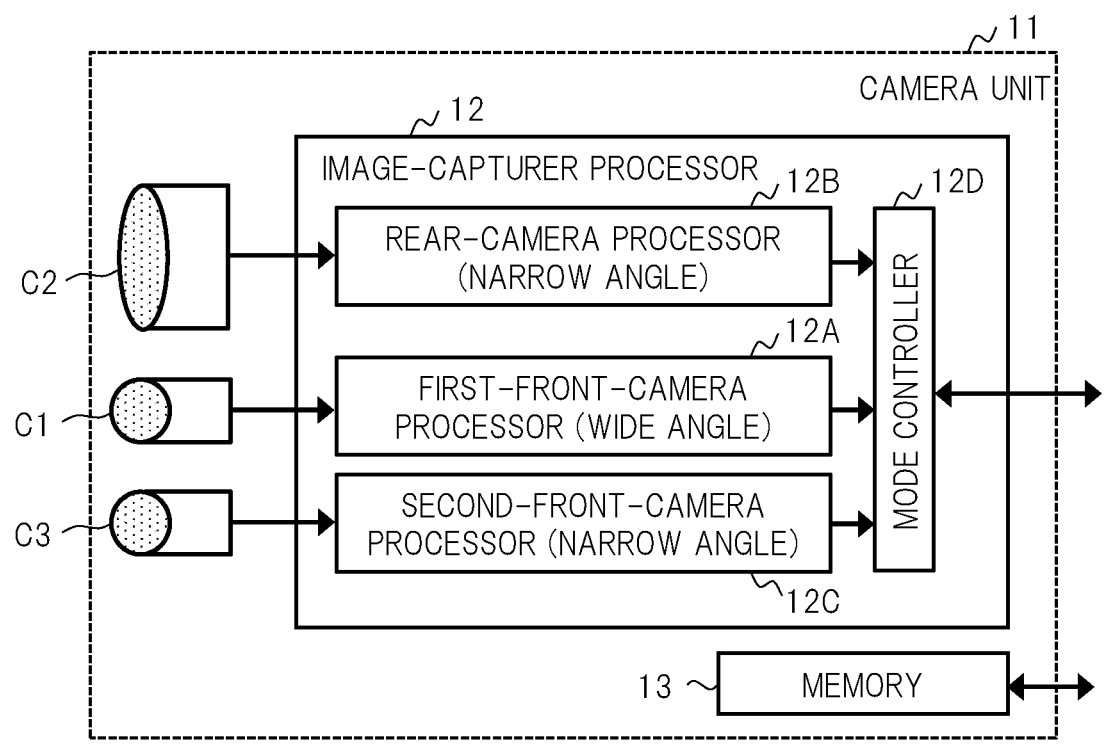
FIG. 20 is a diagram showing a configuration of a camera unit in a mobile information terminal of a second embodiment of the present invention.

FIG. 20 shows a configuration of the camera unit 11 of the mobile information terminal 1 of the second embodiment.

This camera unit 11 includes a front camera "C3" having a regular angle of view in addition to the above-described front camera C1 and regular camera C2 (that may be particularly a wide angle camera). The above-described front camera C1 corresponds to the first front camera, and the front camera C3 corresponds to the second front camera.

The image-capture processor 12 includes a rear-camera processer 12B that processes the regular image of the regular camera C2, a first-front-camera processor 12A that processes the wide angle image of the front camera C1, a second-front-camera processor 12C that processes the regular image of the front camera C3, and a mode controller 12D. In the image-capture processor 12, the mode controller 12D switches a mode of determining which camera of the plurality of cameras is to be used or others. The mobile information terminal 1 switches the camera mode in accordance with the positional relation between the terminal and the face of the user A and the recognition of the terminal arrangement state.

Figure 21:
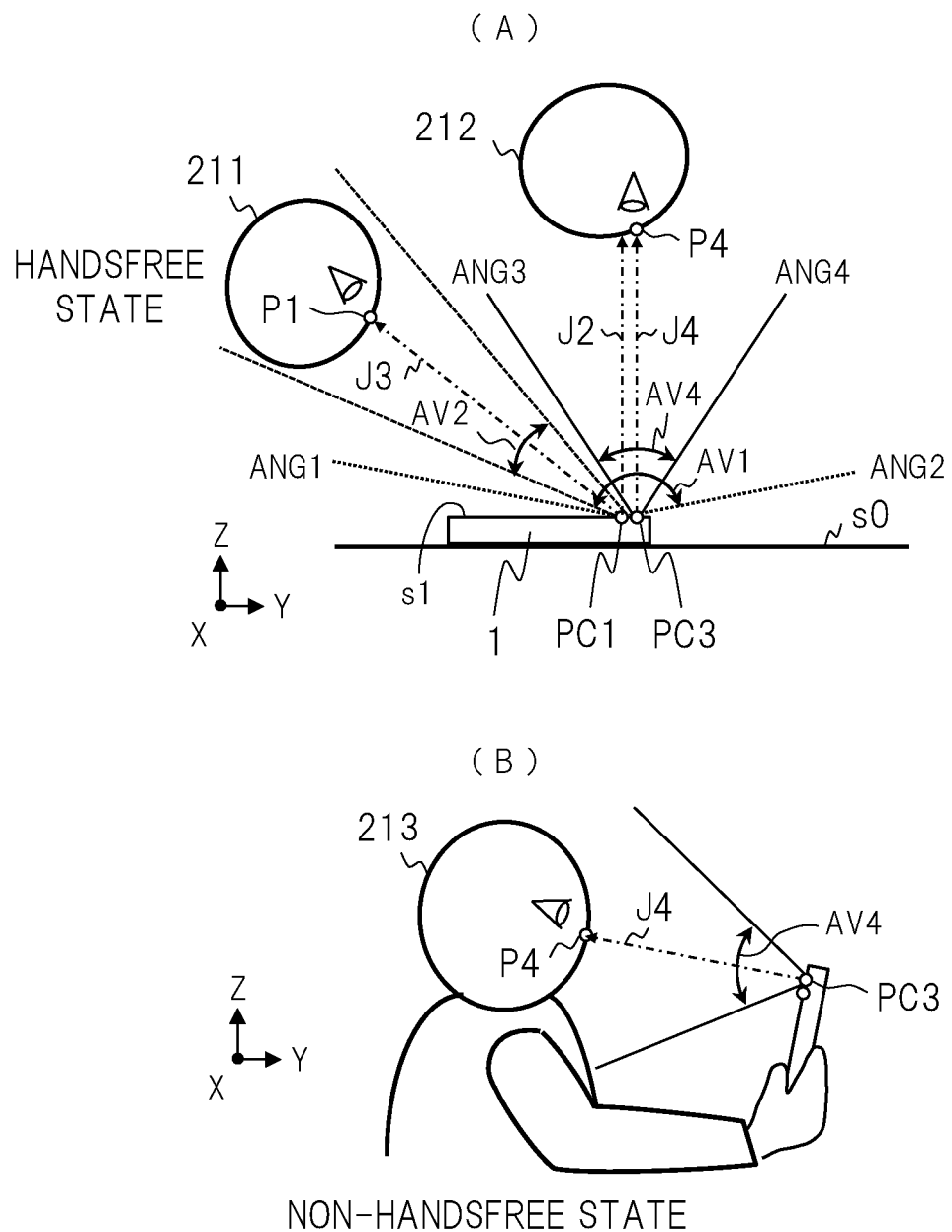
FIG. 21 is a diagram showing a positional relation or others between a user and a terminal in the mobile information terminal of the second embodiment.

FIG. 21 shows an example of the usage state such as the angle of view of the front camera C3 in the mobile information terminal 1 of the second embodiment. In FIG. 21(A), the enclosure of the mobile information terminal 1 is flatly placed on the horizontal surface s0. For example, on the front surface s1 of the enclosure, (particularly a regular lens of) the front camera C3 is mounted at a position "PC3" near the position PC1 of the front camera C1. An optical-axis direction "J4" of the front camera C3 is oriented to be vertically upward as similar to that of the front camera C1. The drawing illustrates an angle of view "AV4" of the front camera C3 (in an angle range from a first angle "ANG3" to a second angle "ANG4"). This angle of view AV4 is narrower than the angle of view AV1 of the front camera C1, and, for example, the first angle ANG3 is about 60 degrees while the second angle ANG4 is about 135 degrees.

A state 211 is the same as the state of FIG. 2, and shows a case of the face of the user A, an image of which can be captured at the angle of view AV2 inside the angle of view AV1 of the front camera C1. A state 212 shows a case of the face of the user A, an image of which can be captured at the angle of view AV4 of the front camera C3 as a position relation. For example, a typical point "P4" of the face of the user A is at a position to which the optical-axis direction J4 of the front camera C3 extends.

The mobile information terminal 1 switches the camera mode into a camera mode using the front camera C3 of the plurality of cameras in the case of the positional relation as shown in the state 212 in which the face image can be captured by the front camera C3. The mobile information terminal 1 switches the camera mode into a camera mode using the front camera C1 in the case of the positional relation as shown in the state 211 in which the face image can be captured at an angle of view inside the angle of view AV1 of the front camera C1 except for the angle of view AV4.

FIG. 21(B) illustrates an example of the non handsfree sate of the second embodiment, and shows a state closer to the non handsfree state of FIG. 19. For example, when the position of the face of the user A moves from the state 211 to a state 213 of FIG. 21(B), the mobile information terminal 1 controls the camera mode to be switched from the mode using the front camera C1 to the mode using the front camera C3 so as to make the video call in the non handsfree mode (regular mode). Similarly, when the position of the face of the user A moves from the state 213 to the state 211, the mobile information terminal 1 controls the camera mode to be switched from the mode using the front camera C3 to the mode using the front camera C1 so as to make the video call in the handsfree mode. In accordance with the mode switching, the wide angle image created by the front camera C1 and the regular image created by the front camera C3 are switched from each other as the input image.

The mobile information terminal 1 may automatically select and switch either of the two camera modes on the basis of the state recognition or may select and switch it on the basis of the user's instruction operation and setting. In the mode using the regular image of the front camera C3, the distortion correcting processing and others are unnecessary, and therefore, the processing can be made efficient.

The mobile information terminal 1 may detect the face region of the user A inside the image by using the face detecting function 201 when the front camera C1 or the front camera C3 is operated, select the camera to be used on the basis of the position, the direction and the angle of view of the face region, and switch the mode. For example, the mobile information terminal 1 may select either the mode using the front camera C3 or the mode using the front camera C1 depending on whether or not the face is within a predetermined angle of view corresponding to the angle of view AV4 of the front camera C3, the predetermined angle of view being inside the angle of view AV1 of the front camera C1.

As described above, according to the mobile information terminal 1 of the second embodiment, the processing can be made efficient along with the achievement of the same effect as that of the first embodiment because of the combination use of the front camera C3 having the regular angle of view. Note that the positions of the front cameras C1 and C3 on the front surface s1 of the enclosure of the mobile information terminal 1 are not limited to those of the above-described configuration, and another position is applicable. For example, the positions may be at points inside the rectangular shape of the display screen DP of the front surface s1.

Another Embodiments

The following examples are also applicable as another embodiments (modification examples) of the first and second embodiments are also applicable.

MODIFICATION EXAMPLE (1)

Image-Capture Processing

The image-capture processor 12 of the first embodiment detects and trims the face region from the wide angle image as shown in FIG. 5 and others, and then, performs the distortion correcting processing to the trimmed image region. A method of the image-capture processing is not limited to this, and another method is also applicable.

Figure 22:
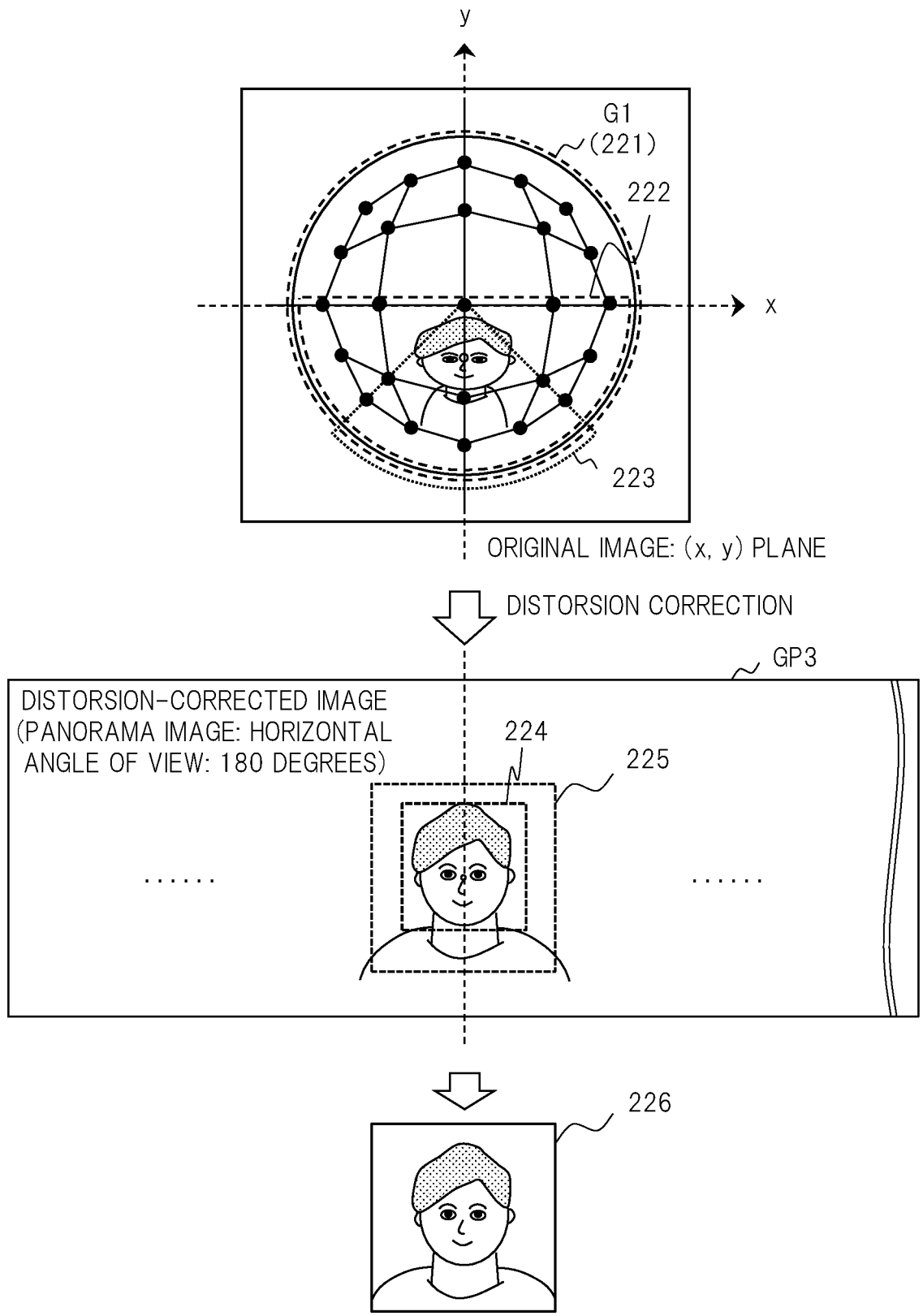
FIG. 22 is a diagram showing an image-capture processing and an image example in a mobile information terminal of a modification example of an embodiment.

FIG. 22 shows an image example of an image-capture processing of the mobile information terminal 1 in a modification example. The image-capture processor 12 of the mobile information terminal 1 performs the distortion correcting processing to the entire wide angle image G1 first, and then, detects and trims the face region or others from the distortion-corrected image. The mobile information terminal 1 performs the distortion correcting processing to a region (a range 221) at a horizontal angle of view of 360 degrees or a region (a semicircular range 222 on a lower side of an x axis) at a horizontal angle of view of 180 degrees, so that a corresponding planarized image "GP3" is acquired. In an example of FIG. 22, a panorama image in the case of the range 222 at the horizontal angle of view of 180 degrees is schematically illustrated as the distortion-corrected image to be the planarized image GP3. The mobile information terminal 1 detects a region (such as a region 224) including the face of the user A from the planarized image GP3. Then, the mobile information terminal 1 extracts and trims a region 225 to be trimmed from the region 224, acquire a trimmed region 226, and creates the transmission image D12 or others from the trimmed region 226.

An area of the image region to be subjected to the distortion correcting processing in this modification example is larger than that of the above-described first embodiment. The modification example is more advantageous in terms of the processing efficiency and others since the image-capture processing of the first embodiment has a smaller area of the image region to be subjected to the distortion correcting processing. The modification example may be applied to a case of a terminal having a high calculating performance. The modification example is more advantageous in terms of the easiness of the image processing for the face detection since the image targeted on the face detection is the planarized image.

In another modification example, at the time of the detection of the face region from the wide angle image with the distortion, the mage-capture processor 12 compares and identifies the region by using the face image of the registration image D10 of the user A. The face image of the registration image D10 at this time may be the face image with the distortion that has been previously captured by the front camera C1.

In still another modification example, at the time of the processing of the face detection or others, the mobile information terminal 1 may refer to an image region of a partial range such as the semicircular range 222 on the lower side of the x axis in FIG. 22 (a range at an elevation angle from 0 degree to 90 degrees in FIG. 2), and may narrow the processing-target image region into this range and ignore an upper-half image region. Further, the region may be narrowed into a range having a narrower horizontal angle of view as shown in the example of the region 223. Alternatively, for example, the mobile information terminal 1 may narrow the processing-target image region as described above when recognizing the state as shown in FIG. 2. In the first state of FIG. 2, the face of the user A is projected within the lower semicircular range 222 of the wide angle image, but may be hardly projected within the upper semicircular range. Therefore, the processing as described above is effective.

In another method of the image-capture processing, the mobile information terminal 1 may perform a simple first distortion correcting processing to the wide angle image first by using the distortion correcting function 203, and then, detect and trim the face image, and perform a highly-accurate second distortion correcting processing to the trimmed image at the end.

In a modification example, by not the confirmation and the operation by the user A but the mobile information terminal 1, it may be automatically determined whether or not the distortion-corrected image is allowed as the transmission image D12. For example, the mobile information terminal 1 compares the face region of the distortion-corrected image with the face region of the registration image D10, evaluates a reproduction level of the face, and calculates an evaluation value. When the evaluation value is equal to or larger than a set threshold value, the mobile information terminal 1 determines the transmission allowance.

MODIFICATION EXAMPLE (2)

Object Recognizing Function

In the mobile information terminal 1 of the modification example, (particularly the face detecting function 201 of) the image-capture processor 12 may have an object recognizing function. This object recognizing function is a function that recognizes a predetermined object except for the face and detects an object region from the wide angle image on the basis of an image processing. Since the user A can freely move the user's hands during the video call in the handsfree state of FIG. 2, the object held in the hands can be projected to the front camera C1. In the manner, not only the face of the user A but also an optional object held in the hands can be projected inside the transmission image D12 so that the object is around the face, and can be shown to (the user B of) the other side.

The predetermined object is an object that is previously defined by an information processing. The image-capture processor 12 has a detection algorithm handling the object. As the predetermined object, for example, a document, a photograph, a notebook and a laptop PC screen of the user, a thing and an animal of the user and others are cited. The predetermined object is defined as, for example, a region having a predetermined shape such as a rectangular shape or a circular shape, a predetermined color or others. On the basis of the detected face region, (the object recognizing function of) the image-capture processor 12 may, for example, search and detect a region of the predetermined object within a range having a predetermined distance around the face region.

FIG. 23(A) shows an image example in a case of usage of the object recognizing function. This image is in a state of the planarized image without the distortion. During the video call in the handsfree state, the user A is having the chat while showing an object 230 to (the user B of) the other side. The object 230 is, for example, a document having an A4 paper size or others that is substantially rectangular inside the distortion-corrected image. The mobile information terminal 1 detects not only the face region 231 but also a region 232 of the specific object 230 from the image by using the object recognizing function. The mobile information terminal 1 also performs the distortion correcting processing or others to the region 232 of the object 230. The mobile information terminal 1 may search the specific object in a range up to, for example, a predetermined distance 233 peripherally from the point P1 of the face region 231. The mobile information terminal 1 may extract, for example, a rectangular region 234 including the face region 231 and the region 232 of the object 230 to create the transmission image D12. Alternatively, the image may be not the image around the face region 231 (point P1) as its center but the smallest rectangular image including the face and the object as shown in a region 235.

Alternatively, the mobile information terminal 1 may separate the face region 231 and the region 232 of the object 230 to create the transmission image D12 for each region, and display the transmission images as the monitor image D13 (images 236 and 237), and ask the user to confirm the transmission. Alternatively, the mobile information terminal 1 may create an image focusing on the detected object 230 (an enlarged image centered at the object 230) as the monitor image D13. Alternatively, when a region having a large distance around the face image is extracted by using the region A3 or the region B3, the object can be automatically captured inside the region even if the object recognizing function is eliminated.

Since the present object recognizing function uses the wide angle image, both images of the face and the object can be acquired even if the face and the object separate from each other to some extent. For example, FIG. 23(B) shows a planarized panorama image "GP4" based on the wide angle image. This panorama image GP4 includes a region "r1" where the face of the user A is projected at a position in the direction Y2 or J3 of FIG. 2 or a position on a lower side of the y axis of FIG. 10 (the position is assumed to have a horizontal angle of view of 0 degree). And, a region "r2" where the predetermined object is projected exists at a position that is away by a certain distance from the above-described position, such as a position having a horizontal angle of view of 90 degrees on a right side of the x axis. Both of the regions can be captured inside one wide angle image, and can be created as the transmission image D12.

In another modification example, (the object recognizing function of) the image-capture processor 12 may detect the hand(s) of the user A from the wide angle image, extract a region including the face of the user A and the hand(s), and create the transmission image D12. And, when the both hands are projected inside the wide angle image, it can be determined that the user is not holding the enclosure in his/her hands. Therefore, the mobile information terminal 1 may switch the mode into the handsfree mode when detecting the both hands of the user A from the wide angle image.

MODIFICATION EXAMPLE (3)

Face Images of Plurality of Users

A modification example can also take a usage method in which, for example, while one mobile information terminal 1 is placed on a desk, a plurality of users who are callers on one transmission side can make the video call with (the user B of) the other transmission side by using the same mobile information terminal 1. In this case, the mobile information terminal 1 in the modification example simultaneously perform the face detection, the distortion correction or others to the plurality of face images of the plurality of the users fitted into the wide angle image in parallel. At this time, the mobile information terminal 1 may separately create a plurality of transmission images D12 for respective user faces projected in the wide angle image, or create one transmission image D12 including the plurality of the faces.

FIG. 24(A) shows an image example including the plurality of user faces in this modification example. This drawing shows a case with another user "C" as one caller who is making the video call in addition to the main user A. The mobile information terminal 1 detects a region "RU1" of the face of the user A and a region "RU2" of a face of the user C from the wide angle image of the front camera C1. For example, the mobile information terminal 1 extracts a (for example, horizontally-long rectangular) region 241 including two face regions of these users, and creates the transmission image D12. Alternatively, the mobile information terminal 1 may extract the two face regions as respective trimmed images 242 and 243, create the respective transmission images D12, and display the images in parallel. Even when the number of users is equal to or larger than three, the modification example is basically similarly applicable. However, the number is limited so that the image has faces of a predetermined number of people (such as four people) to avoid the large number of people. The mobile information terminal 1 may display the monitor images D13 of the respective faces of the plurality of users inside the display screen DP.

The mobile information terminal 1 may recognize a face of a user who is currently chatting among the plurality of faces inside the wide angle image, by performing the image processing to the wide angle image, particularly by detecting a mouth state, and create the transmission image D12 for the face of the user who is currently chatting or others. Further, the mobile information terminal 1 may recognize a face of a user who is currently chatting among the plurality of faces inside the wide angle image, by performing the image processing in conjunction with the voice/sound processing using the microphone 17. The mobile information terminal 1 may display the monitor images D13 of the plurality of users in parallel inside the display screen DP, or switch the images in a temporal axis.

When the faces of the plurality of users are handled as described above, the above-described processing may be performed so as to aim at only a plurality of users whose face images have been previously registered as the registration images D10 in the mobile information terminal 1. The mobile information terminal 1 does not handle a face of a person (such as a passenger) whose face image has not been previously registered therein. When a face(s) of one (or some) of the users cannot be handled on time, the mobile information terminal 1 may use the registration image D10 as the replacement image, or an image of another icon, scenery or others as the replacement image.

In the image example of the above-described FIG. 24(A), the faces of the plurality of people (the user A and the user C) are projected in a region within an angle of view in certain direction in view of the front camera C1 (such as a region L1 on a lower side of the y axis of FIG. 24(B)). The image example is not limited to this, but also applicable to even a case in which each person is at each position having a different horizontal angle of view around the position of the mobile information terminal 1 on the horizontal surface s0, when a wide angle of view of the front camera C1 is used. This example is also applicable to even a case in which, for example, there are the faces in all the regions L1 to L4 that are on up and down side of the y axis and right and left side of the x axis in a circumferential region of the wide angle image G1 of FIG. 24(B). In other words, the plurality of faces of the plurality of people can be captured inside one wide angle image, and these images can be created as the transmission image D12.

MODIFICATION EXAMPLE (4)

Other-Side-Image Correcting Function

FIG. 25 shows an other-side-image correcting function that the mobile information terminal 1 of the modification example has. When the image of the other side is displayed inside (the region R1 of) the display screen DP as shown in FIG. 7, the mobile information terminal 1 of the modification example displays a reversely trapezoid-corrected image by using this other-side-image correcting function.

FIG. 25(A) shows an example of a regular other-side image that the mobile information terminal receives from the mobile information terminal 2 of (the user B of) the other side. In the region R1 inside the display screen DP of the mobile information terminal 1, a right-angle quadrangular image "g1" of the other side is displayed.

FIG. 25(B) schematically shows how the image g1 of FIG. 25(A) looks like in the state as shown in FIG. 2, the image g1 being in an obliquely downward direction from the eyes (point P1) of the user A. In a state of FIG. 25(B), the image g1 looks like having a trapezoid shape with an upper side that is smaller than a lower side. In other words, in the view from the user A, a head side of the user B is slightly relatively small.

The mobile information terminal 1 recognizes the positional relation between the user A and the terminal and the terminal arrangement state on the basis of the analysis for the wide angle image of the front camera C1 and the detection information of the sensors 30. For example, the mobile information terminal 1 estimates a position of the face of the user A and a state such as a distance from the terminal on the basis of a position of the eyes and a direction of a line of sight of the user A in the image, a size of the face and others. The mobile information terminal 1 sets a ratio in the reverse trapezoid correction (ratio of the upper side and the lower side) or others in accordance with the recognized state. The mobile information terminal 1 performs the reverse trapezoid correcting processing to the right-angle quadrangular image that the mobile information terminal 1 receives from the mobile information terminal 2 of the other side, in accordance with the ratio or others to acquire an image having a reverse trapezoidal shape. The ratio may be a preset value.

FIG. 25(C) shows an image "g1b" that is acquired by reversely trapezoid-correcting the image g1 of FIG. 25(A). This image g1b has a reverse trapezoidal shape with a large upper side and a small lower side. The mobile information terminal 1 displays the image g1b having the reverse trapezoidal shape into the region R1 of the display screen DP. In the state of FIG. 2, the user A looks at the image g1b of the other side inside the region R1 of the display screen DP that is in the obliquely downward direction from the eyes (point P1). At this time, in this state, the other-side image in the view from the user A looks like having a nearly right-angle quadrangular shape as shown in FIG. 25(A). In the manner, the user A is easier to visually recognize the other-side image, and this manner is more convenient.

MODIFICATION EXAMPLE (5)

Three-Dimensional Image Processing Function

In another modification example, the mobile information terminal 1 may use a function (three-dimensional image processing function) that processes not only a two-dimensional image but also a three-dimensional image. For example, the camera unit 11 (such as the regular camera C2) may have publicly-known infrared camera function and three-dimensional sensor module. By using them, the image-capture processor 12 processes the wide angle image of the front camera C1 as the three-dimensional image. For example, the mobile information terminal 1 emits, for example, several tens of thousands of infrared dots to the face of the user by using these infrared camera function and three-dimensional sensor module. The mobile information terminal 1 captures the infrared dots by using an infrared camera, recognizes small surface irregularity of the face, and creates a three-dimensional face map (a corresponding three-dimensional image). The mobile information terminal 1 may perform the distortion correcting processing or others to this three-dimensional image. Alternatively, the mobile information terminal 1 may perform a three-dimensional face correcting processing to this three-dimensional image by comparing the image with three-dimensional face image information of the registration image D10. In this case, clearer and more accurate correction is achieved.

At the time of such a three-dimensional sophisticated correction, the mobile information terminal 1 may not only simply compare the images but also additionally analyze the images by using a mechanical learning such as deep learning. For example, the mobile information terminal 1 may have an AI engine therein, the AI engine having a deep learning function (software and hardware performing the deep learning by using convolution neural network). The mobile information terminal 1 enhances performances of the face detection and the face correction by using the AI engine to learn the face of the user on the basis of the camera image. In the manner, the face of the user A can be detected, recognized and corrected in consideration of, for example, specifically difference in or influence of change due to a hair style or makeup of the person, existence or absence of eye glasses or sunglasses, a length of beard or others.

In the mobile information terminal 1, the personal recognizing function 201B may compare and identify the three-dimensional face image of the registration image D10 with a three-dimensional face image that has been captured by the front camera C1 and been distortion-corrected. In the manner, the personal recognition for whether the face image corresponds to the face of the user A or not can be more accurately achieved.

MODIFICATION EXAMPLE (6)

Directional Microphone, Directional Speaker

In still another modification example, the microphone 17 of the mobile information terminal 1 of FIG. 3 may be a direction microphone. The directional microphone includes a voice/sound processing function such as a noise cancelling function. The controller 10 preferentially collects the voice/sound in a direction in which the face of the user A exists, by using the microphone 17. The controller 10 cancels a noise of input voice/sound by using the noise canceling function, and acquires clear voice/sound of the user A. The controller 10 transmits data of the voice/sound together with the transmission image D12 to the mobile information terminal 2 of the other side. In the view from the mobile information terminal 1, the direction in which the face of the user A exists can be recognized on the basis of the state recognition of the mobile information terminal 1 and the face detection inside the image.

The directionality and the noise canceling function of the microphone 17 may be achieved by a publicly-known beam forming technique using a publicly-known MEMS microphone or others. For example, in order to achieve the noise canceling function, a plurality of microphones are basically necessary. However, when the mobile information terminal 1 is small, the plurality of microphones cannot be mounted in some cases. In such a case, the MEMS microphone is mounted on the mobile information terminal 1, so that a specific sound source can be separated from a plurality of sound sources and be intensively acquired by the beam forming technique. In the manner, only the voice/sound of the user A can be intensively acquired.

The mobile information terminal 1 can recognize the position and the direction of the user A at certain accuracy by using the front camera C1. Accordingly, the mobile information terminal 1 roughly identifies the position and the direction of the user A by using the front camera C1. The mobile information terminal 1 may preferentially intensively acquire the voice/sound of the identified position and direction by using the microphone 17 and the beam forming technique.

In still another modification example, the mobile information terminal 1 may roughly estimate the position and the direction of the user A on the basis of analysis for the voice/sound on the microphone 17. The mobile information terminal 1 may perform a processing such as the face detection to the wide angle image in accordance with the position and the direction of the face of the user.

Similarly, a directional speaker may be used as the speaker 18. Directionality, a volume level and others of the voice/sound output of the speaker 18 may be controlled in accordance with the position of the face of the user A with respect to the terminal.

In the foregoing, the present invention has been concretely described on the basis of the embodiments. However, the present invention is not limited to the foregoing embodiments, and various modifications can be made within the scope of the present invention.

EXPLANATION OF REFERENCE CHARACTERS

1 . . . mobile information terminal, 2 . . . mobile information terminal, s0 . . . horizontal surface, s1 . . . front surface, s2 . . . rear surface, DP . . . display screen, C1 . . . front camera, J1, J2 and J3 . . . direction, AV1 and AV2 . . . angle of view, θ1 and θ2 . . . angle, P1, PC1 and PD . . . point, ANG1 and ANG2 . . . angle, AD1 . . . angular difference

The invention claimed is:

1. A mobile information terminal having a video call function comprising:
    a camera configured to generate an image signal from an image of subjects captured through a lens and mounted on a front surface of the mobile information terminal, on which a touch panel display is mounted;
    an image signal processor configured to generate an image data based on the image signal and detect whether a face of a user is included in the image data as a part of the image of subjects;
    a microphone configured to generate a vocal signal;
    a speaker configured to output an audio;
    a storage configured to store a registered image data;
    a communication circuitry configured to communicate with another mobile terminal via the Internet; and
    a control circuitry configured to:
    execute the video call function; and
    transmit at least a transmission image data to the other mobile terminal via the communication circuitry while the video call function is executed,
    wherein the image signal processor is further configured to:
    while the video call function is executed, check whether or not the face is included in the image data;
    in case that the face is not included, generate the transmission image data based on the registered image data; and
    in case that the face is included, generate the transmission image data based on the image data.

2. The mobile information terminal according to claim 1, wherein the image signal processor is further configured to generate the transmission image data trimming the image data based on a region of the image data where the face is included, while the video call function is executed.

3. The mobile information terminal according to claim 1, wherein the image signal processor is configured to generate the transmission image data by performing a distortion correcting process to the image data, while the video call function is executed.

4. The mobile information terminal according to claim 1, wherein the image signal processor is configured to generate a monitor image data corresponding to the transmission image data, and
    wherein the control circuitry is further configured to control to display the monitor image data on the touch panel display, while the video call function is executed.

5. The mobile information terminal according to claim 1, wherein the image signal processor is configured to:
    detect a feature of the face included in the image data; and
    compare the feature of the face with a feature of a specific person's face stored into the storage, and
    wherein the control circuitry is configured to transmit the transmission image data when the comparison result generated by the image signal processor indicates that the feature of the face matches the feature of the specific person's face.

6. The mobile information terminal according to claim 1, wherein the image signal processor is further configured to:
    detect a feature of the object included in the image data;
    compare the feature of the object with a feature of a specific object; and
    generate the transmission image data trimming the image data based on a region of the image data where the specific object is included.

7. The mobile information terminal according to claim 6, wherein the region for the trimming is within a predetermined range from a portion of the image data where the face is included.

8. The mobile information terminal according to claim 1, wherein in case that the face is not included, the image signal processor is further configured to generate the transmission image data replacing a portion of the image data with the registered image data.

9. The mobile information terminal according to claim 1, wherein a view angle of the camera is at least from 30 degrees to 150 degrees.

10. The mobile information terminal according to claim 3, further comprising
    an acceleration sensor and/or a gyroscope sensor,
    wherein the control circuitry is further configured to cause the image signal processor to perform the distortion correcting process based on a signal sensed by the acceleration sensor and/or the gyroscope sensor.

11. A method in a mobile information terminal having a video call function comprising the steps of:
    generating, by a camera, an image signal from an image of subjects captured through a lens and mounted on a front surface of the mobile information terminal, on which a touch panel display is mounted;
    generating, by an image signal processor, an image data based on the image signal and detect whether a face of a user is included in the image data as a part of the image of subjects;
    generating, by a microphone, a vocal signal;
    outputting, by a speaker, an audio;
    storing, by a storage, a registered image data;
    communicating, by a communication circuitry, with another mobile terminal via the Internet;
    executing, by a control circuitry, the video call function;

transmitting at least a transmission image data to the other mobile terminal via the communication circuitry while the video call function is executed;

checking, by the image signal processor while the video call function is executed, whether or not the face is included in the image data;

generating, by the image signal processor in case that the face is not included, the transmission image data based on the registered image data; and generating, by the image signal processor in case that the face is included, the transmission image data based on the image data.

12. The method according to claim 11, further comprising the step of:

generating, by the image signal processor, the transmission image data trimming the image data based on a region of the image data where the face is included, while the video call function is executed.

13. The method according to claim 11, further comprising the step of:

generating, by the image signal processor, the transmission image data by performing a distortion correcting process to the image data, while the video call function is executed.

14. The method according to claim 11, further comprising the steps of:

generating, by the image signal processor, a monitor image data corresponding to the transmission image data; and displaying the monitor image data on the touch panel display, while the video call function is executed.

15. The method according to claim 11, further comprising the steps of:

detecting, by the image signal processor, a feature of the face included in the image data;

comparing, by the image signal processor, the feature of the face with a feature of a specific person's face stored into the storage; and transmitting, by the control circuitry, the transmission image data when the comparison result generated by the image signal processor indicates that the feature of the face matches the feature of the specific person's face.

16. The method according to claim 11, further comprising the steps of:

detecting, by the image signal processor, a feature of the object included in the image data;

comparing, by the image signal processor, the feature of the object with a feature of a specific object; and generating the transmission image data trimming the image data based on a region of the image data where the specific object is included.

17. The method according to claim 16, wherein the region for the trimming is within a predetermined range from a portion of the image data where the face is included.

18. The method according to claim 11, further comprising the step of:

generating, by the image signal processor in case that the face is not included, the transmission image data replacing a portion of the image data with the registered image data.

19. The method according to claim 11, wherein a view angle of the camera is at least from 30 degrees to 150 degrees.

20. The method according to claim 13, further comprising the step of:

causing, by the control circuitry, the image signal processor to perform the distortion correcting process based on a signal sensed by an acceleration sensor and/or a gyroscope sensor.

* * * * *